Sept. 18, 1923.

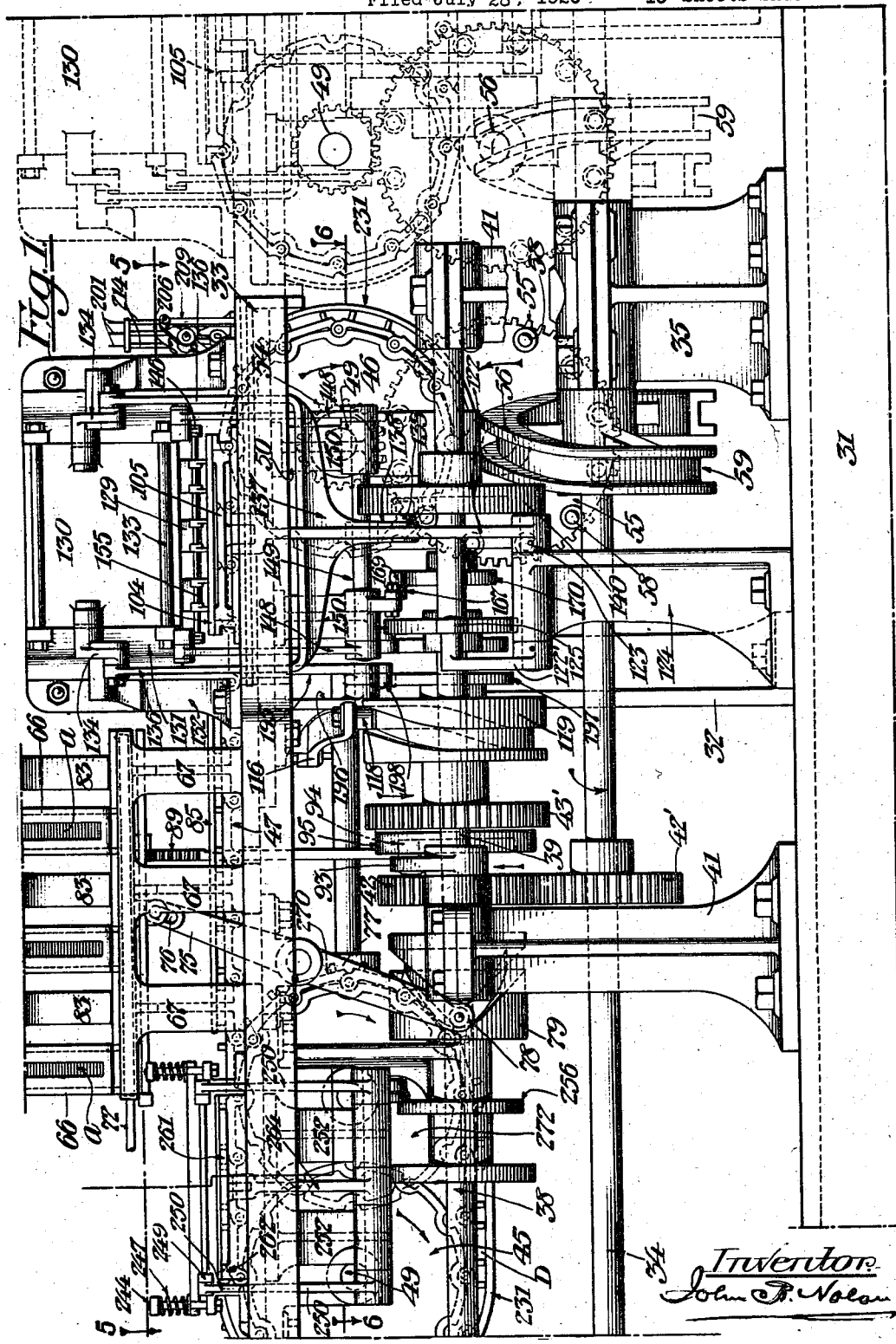

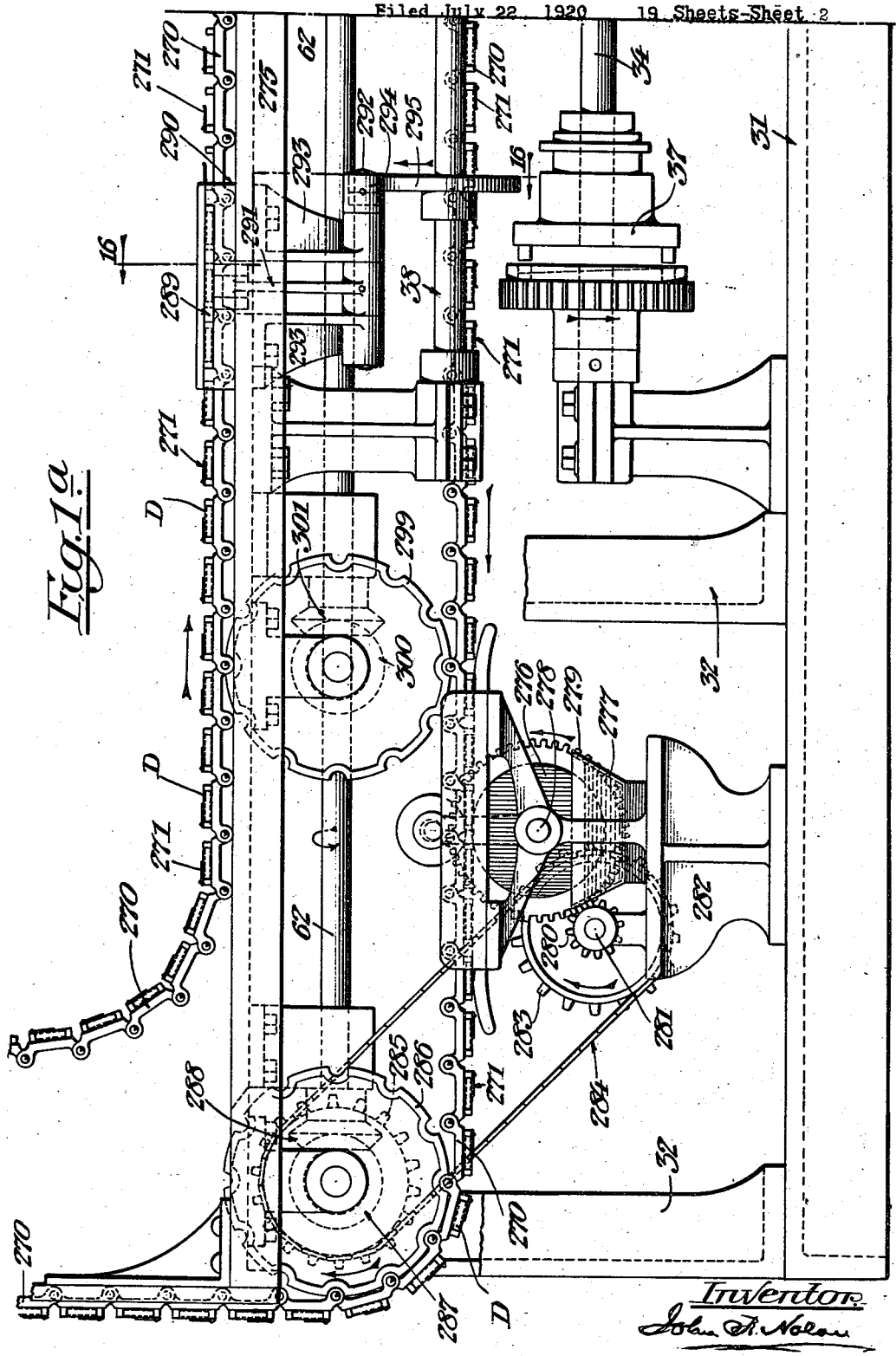

J. R. NOLAN 1,468,310

MACHINE FOR MAKING MATCH BOOKS

Filed July 28, 1920    19 Sheets-Sheet 3

Inventor
John R. Nolan

Sept. 18, 1923.

J. R. NOLAN

MACHINE FOR MAKING MATCH BOOKS

Filed July 28, 1920     19 Sheets-Sheet 4

1,468,310

Sept. 18, 1923.

J. R. NOLAN 1,468,310

MACHINE FOR MAKING MATCH BOOKS

Filed July 28, 1920    19 Sheets-Sheet 5

Fig.4.

Inventor
John R. Nolan

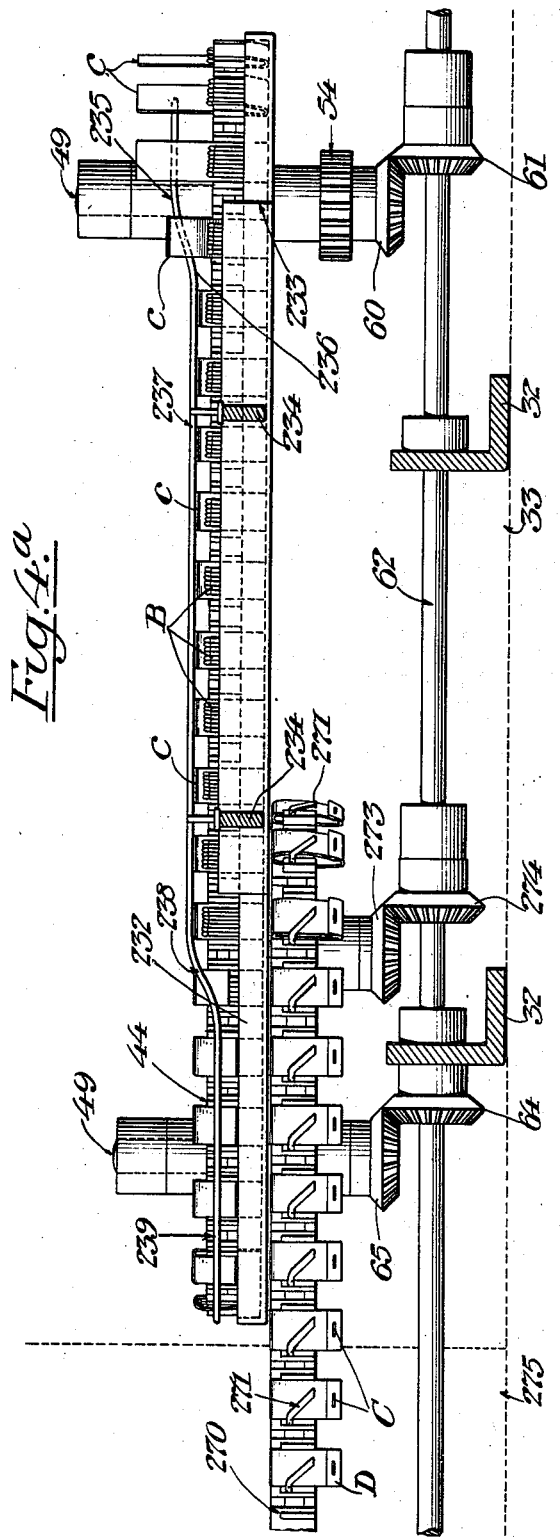

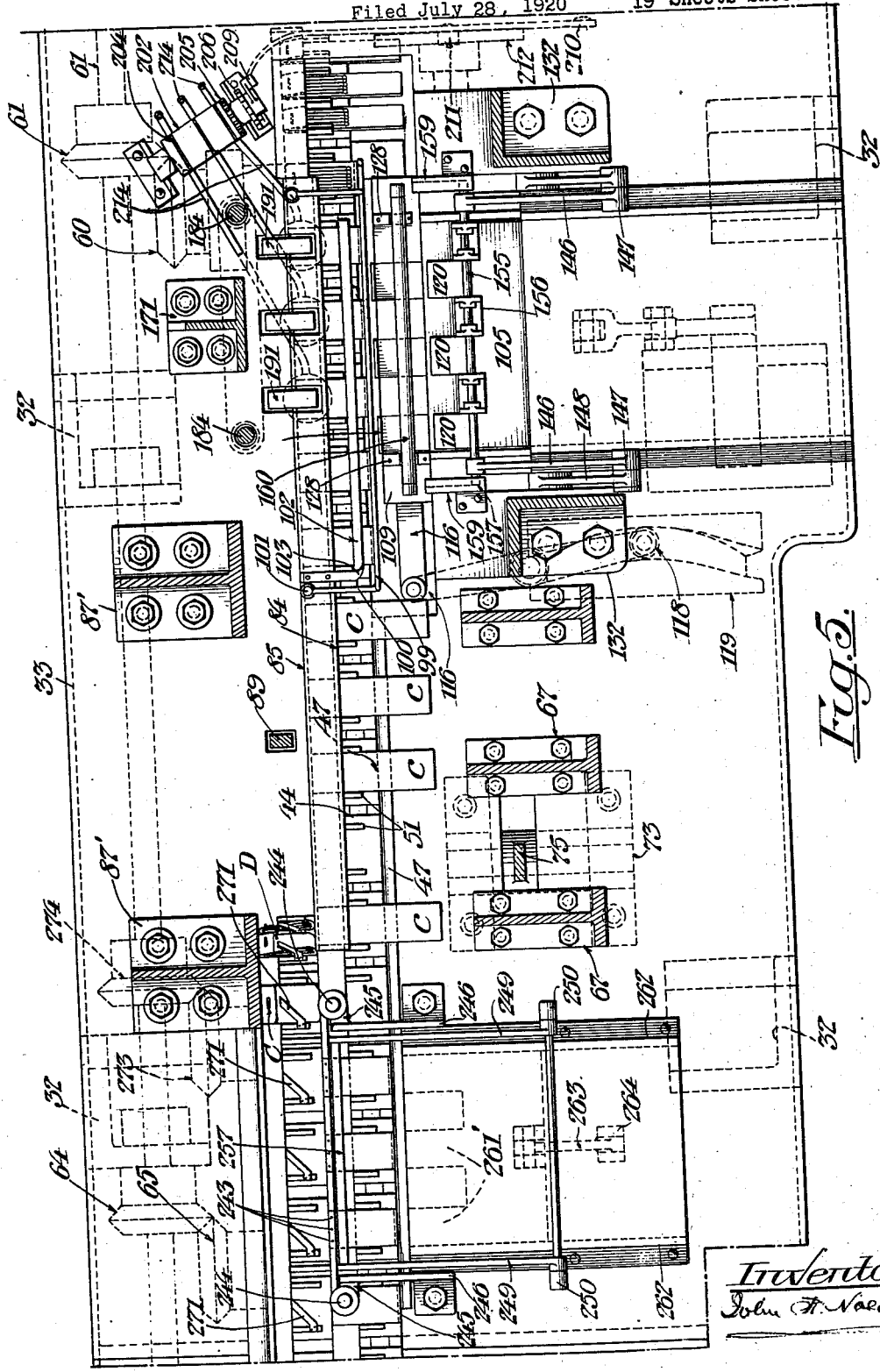

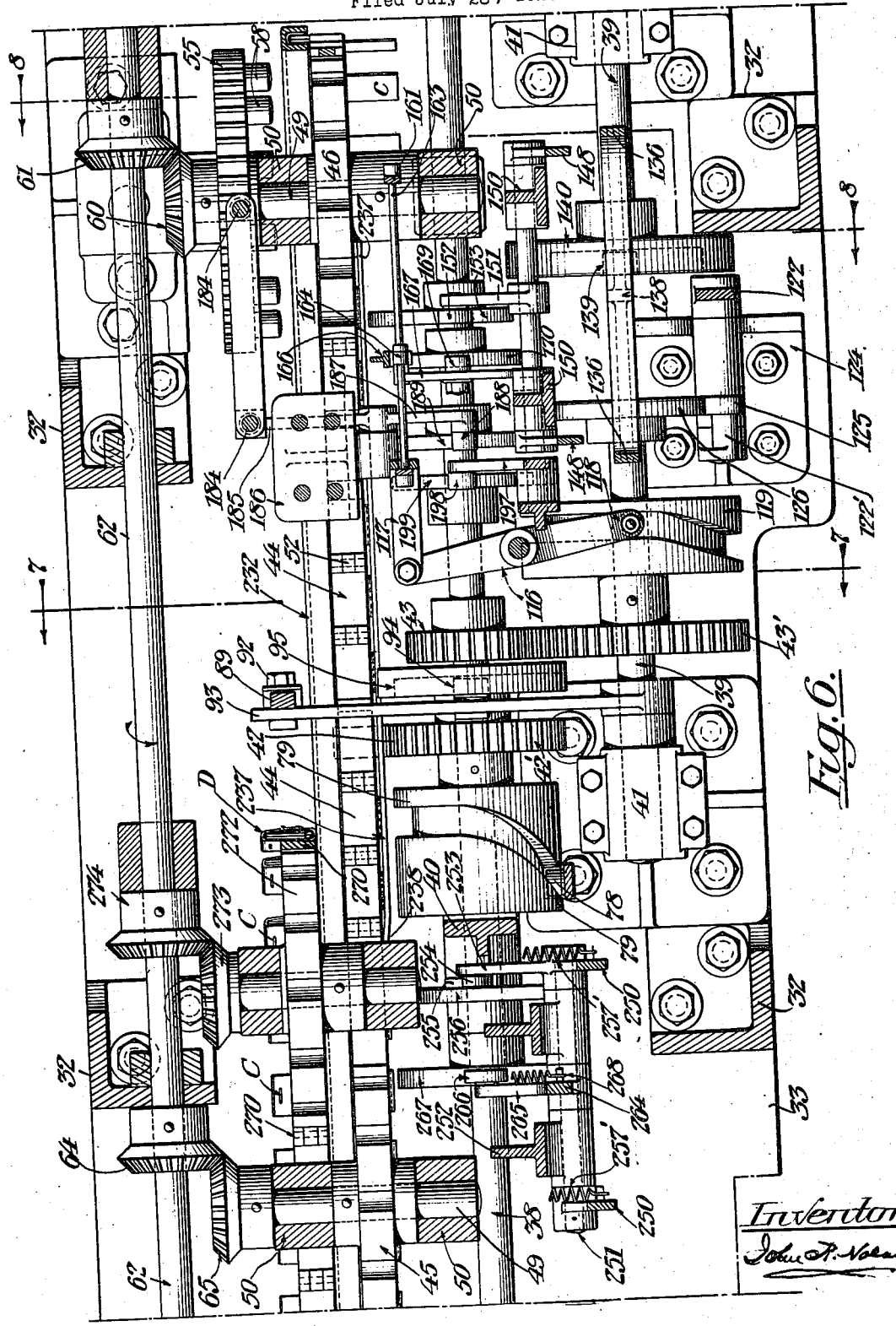

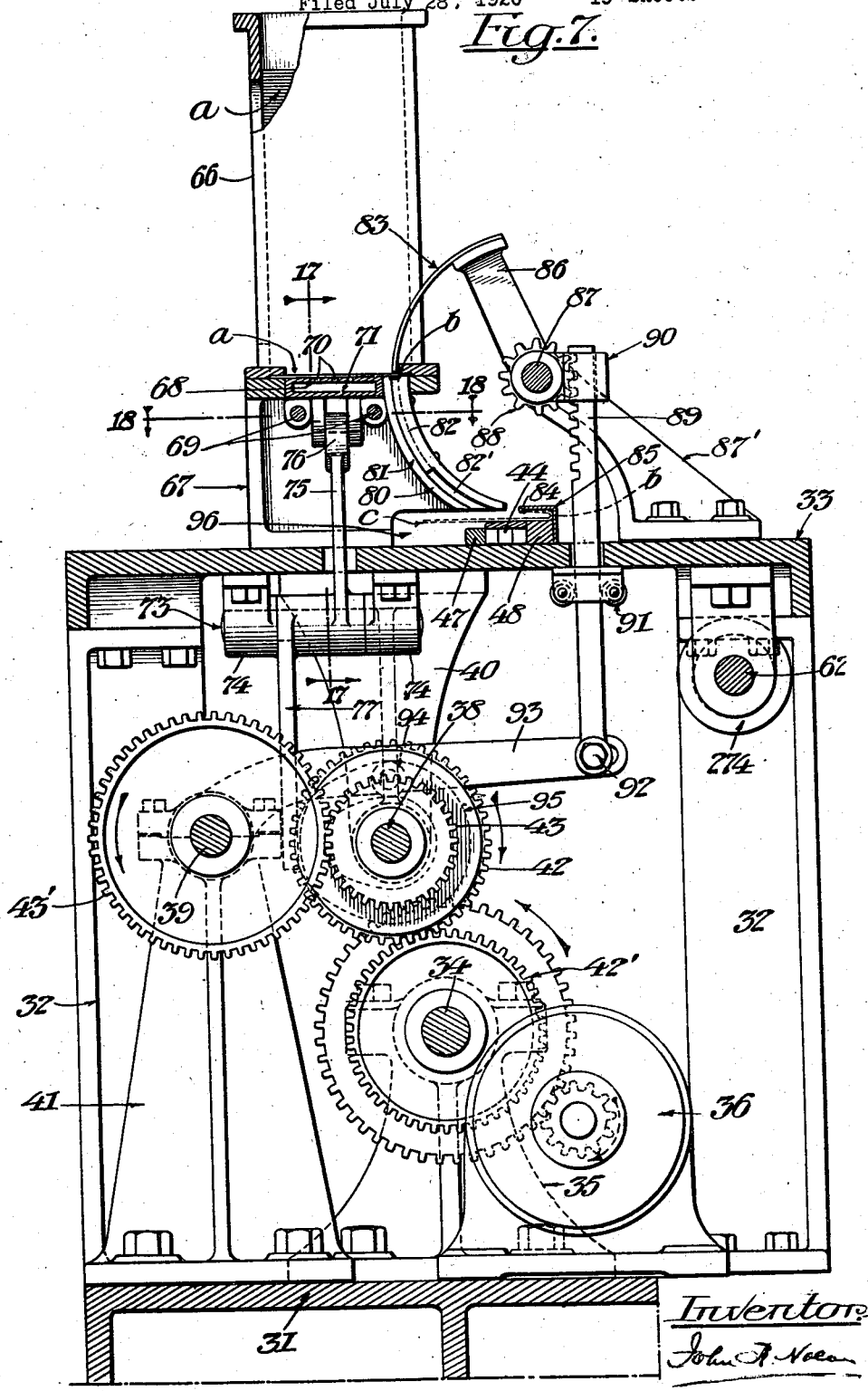

Sept. 18, 1923.
J. R. NOLAN
MACHINE FOR MAKING MATCH BOOKS
Filed July 28, 1920  19 Sheets-Sheet 11

1,468,310

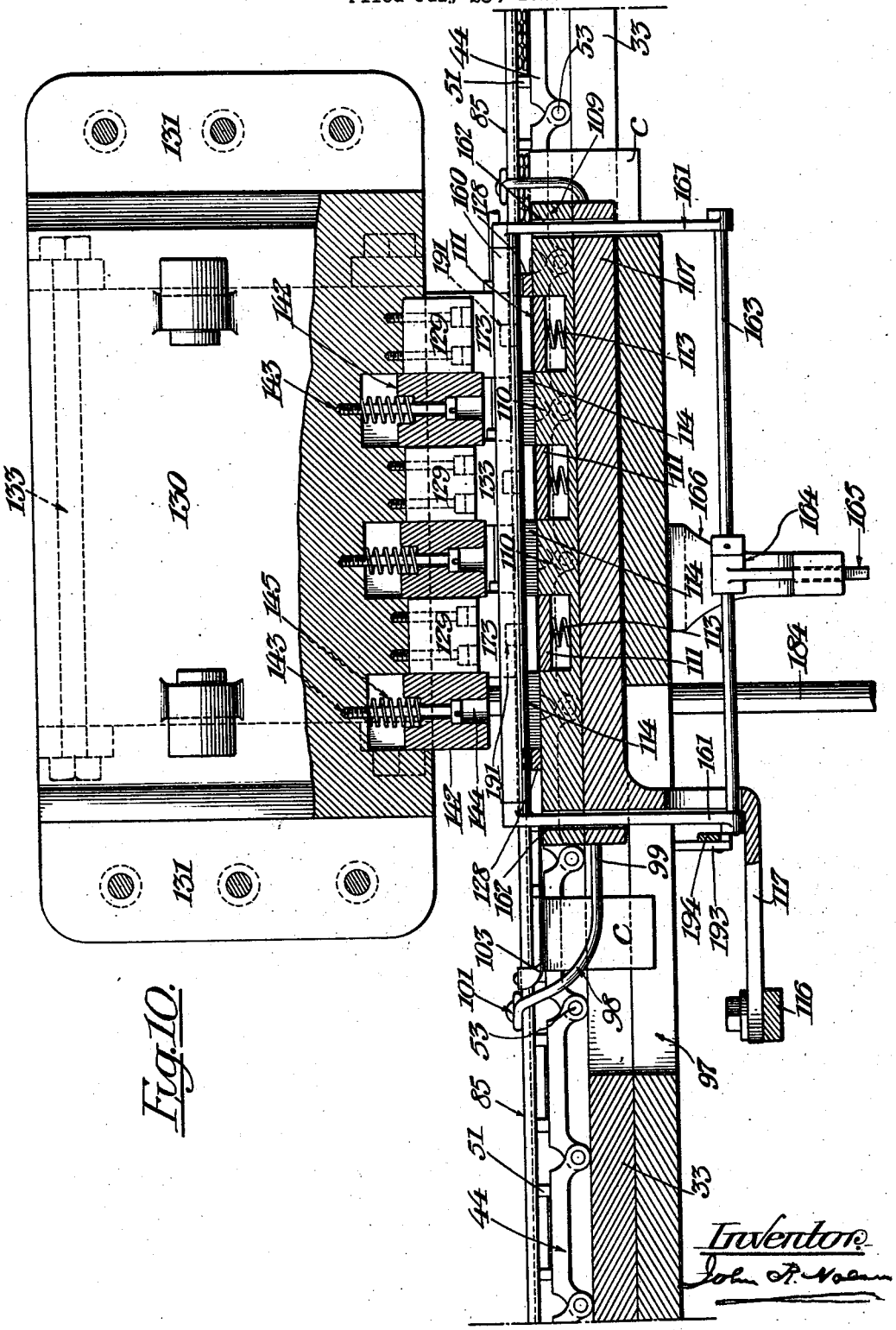

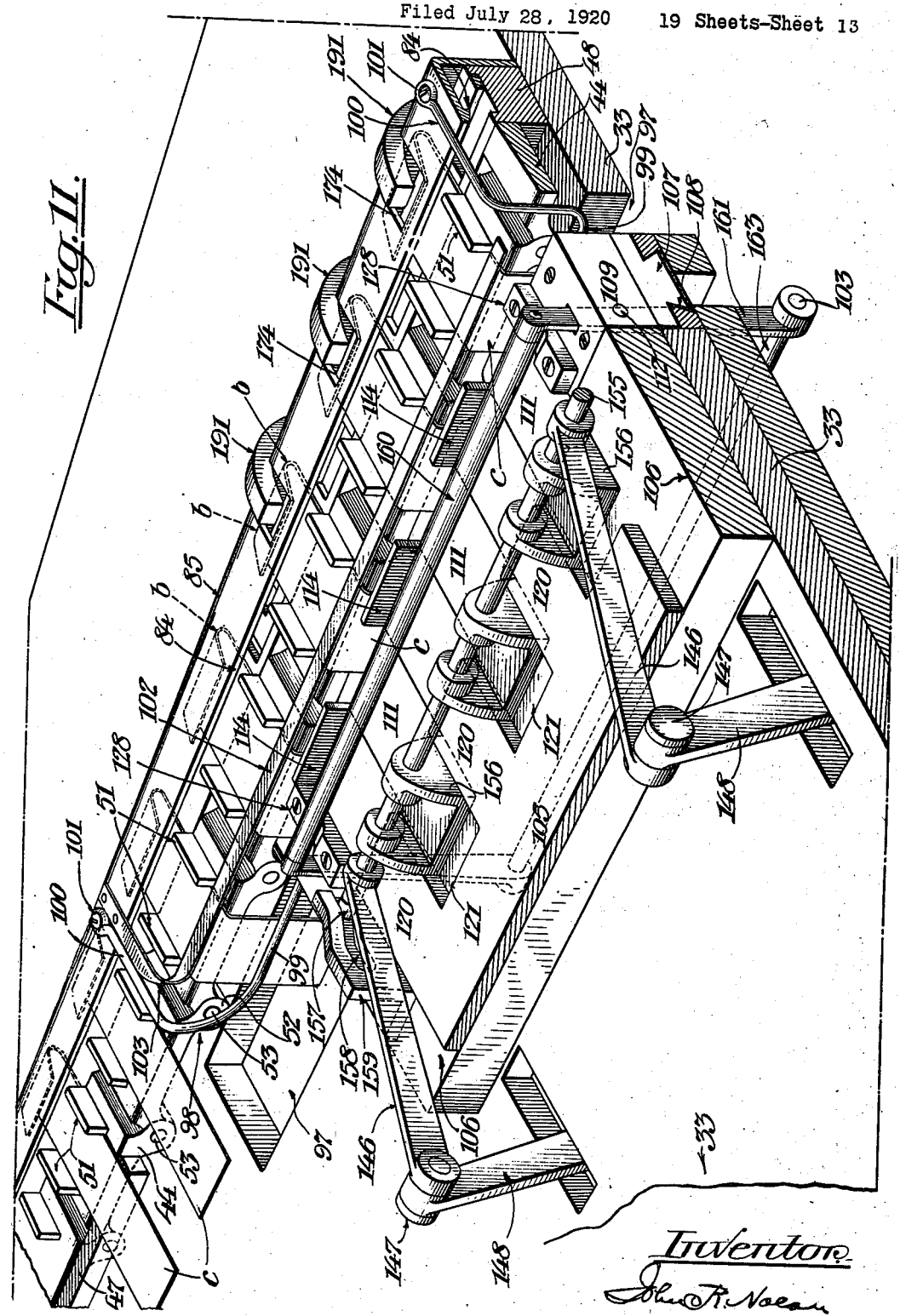

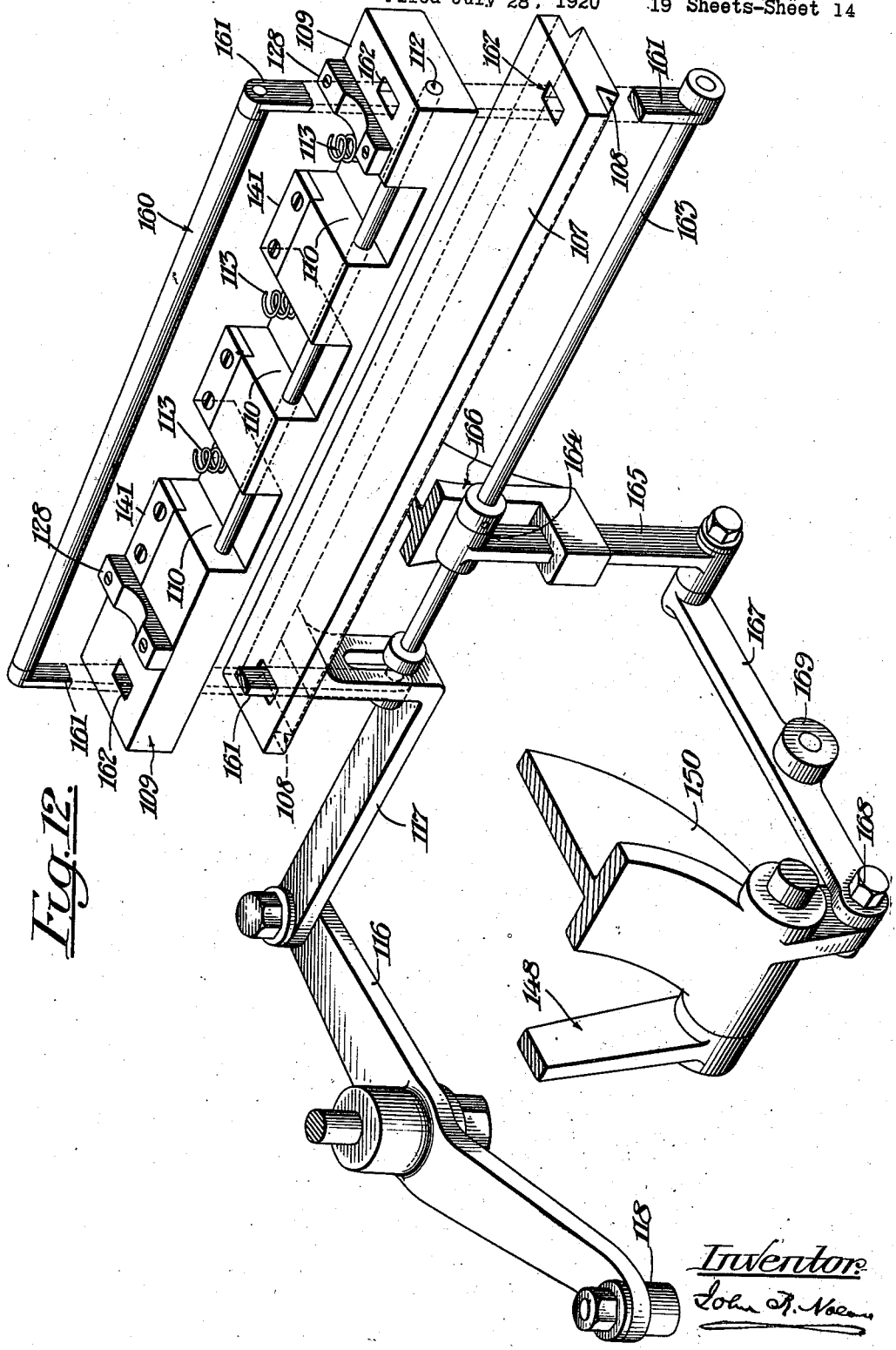

Sept. 18, 1923.
J. R. NOLAN
1,468,310
MACHINE FOR MAKING MATCH BOOKS
Filed July 28, 1920    19 Sheets-Sheet 15
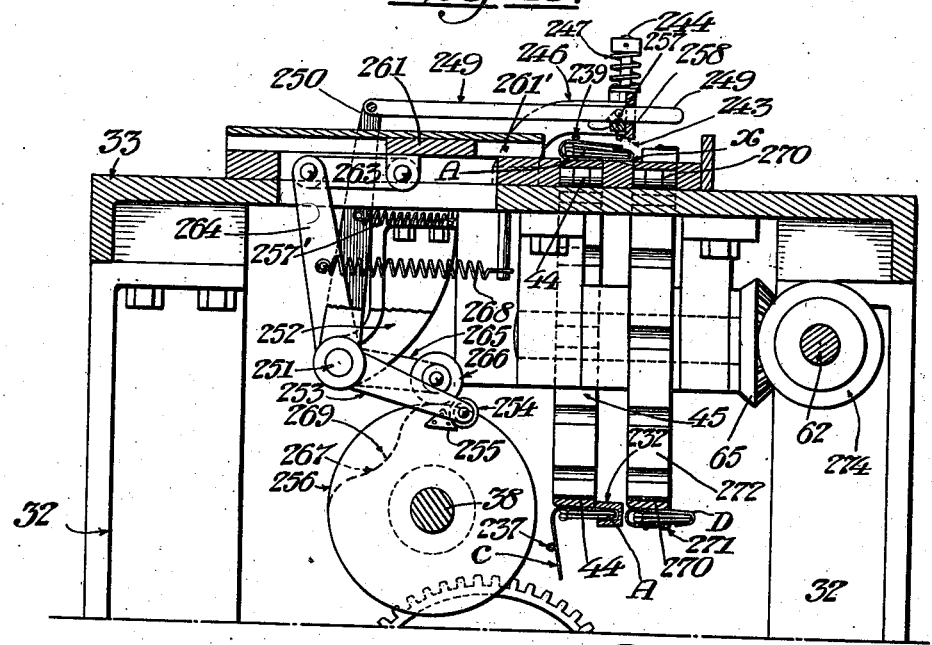
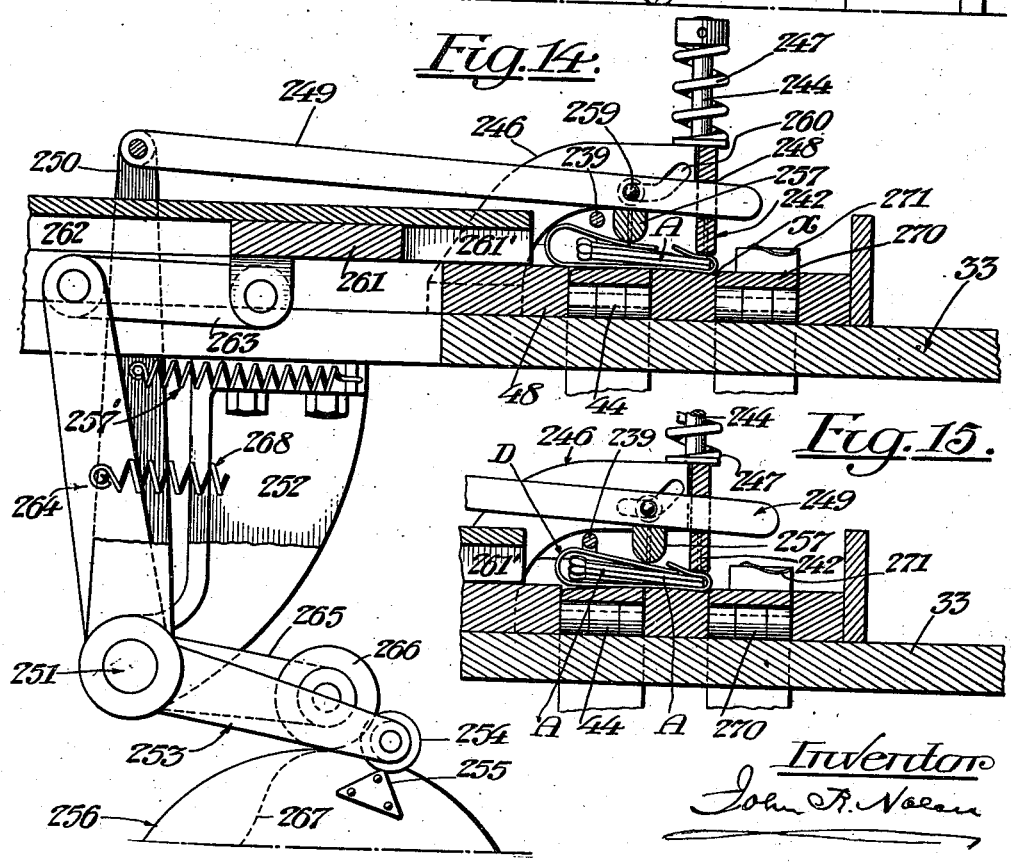

Sept. 18, 1923.

J. R. NOLAN 1,468,310

MACHINE FOR MAKING MATCH BOOKS

Filed July 28, 1920  19 Sheets-Sheet 16

Inventor
John R. Nolan

Sept. 18, 1923.　　　　　　　　　　　　　　1,468,310
J. R. NOLAN
MACHINE FOR MAKING MATCH BOOKS
Filed July 28, 1920　　19 Sheets-Sheet 17

Inventor
John R. Nolan

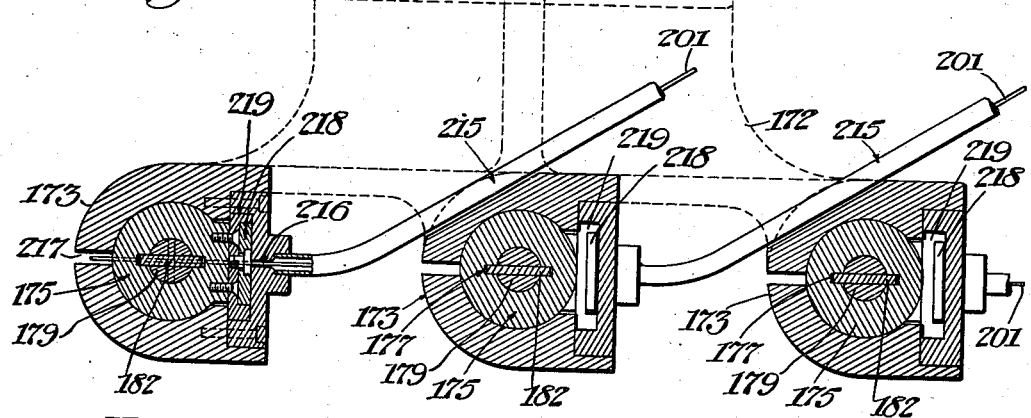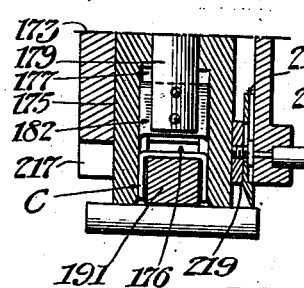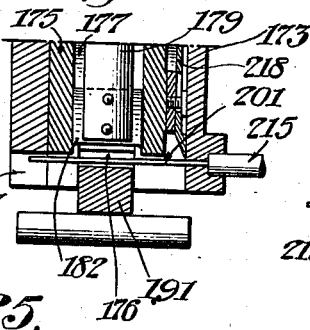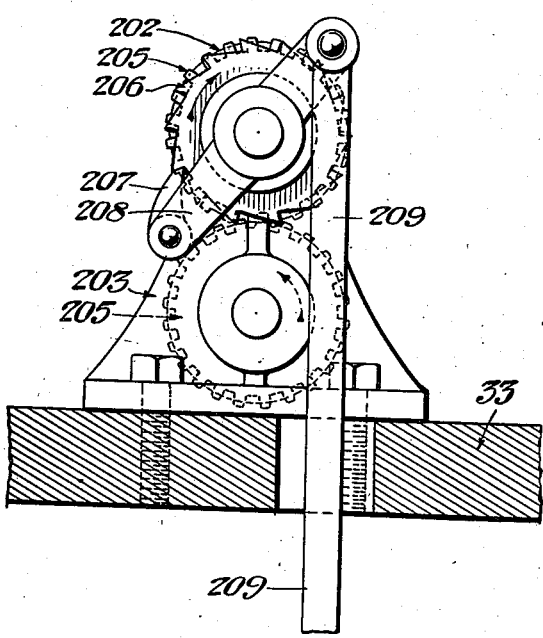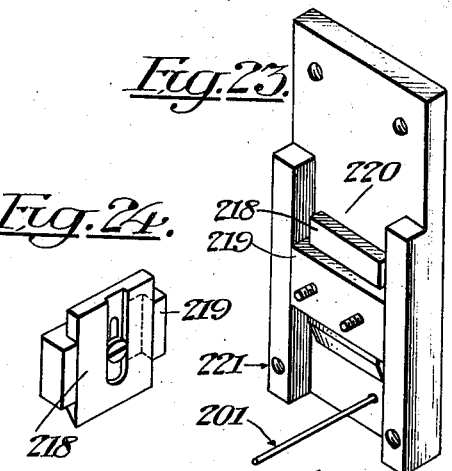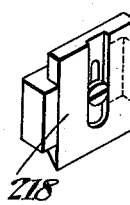

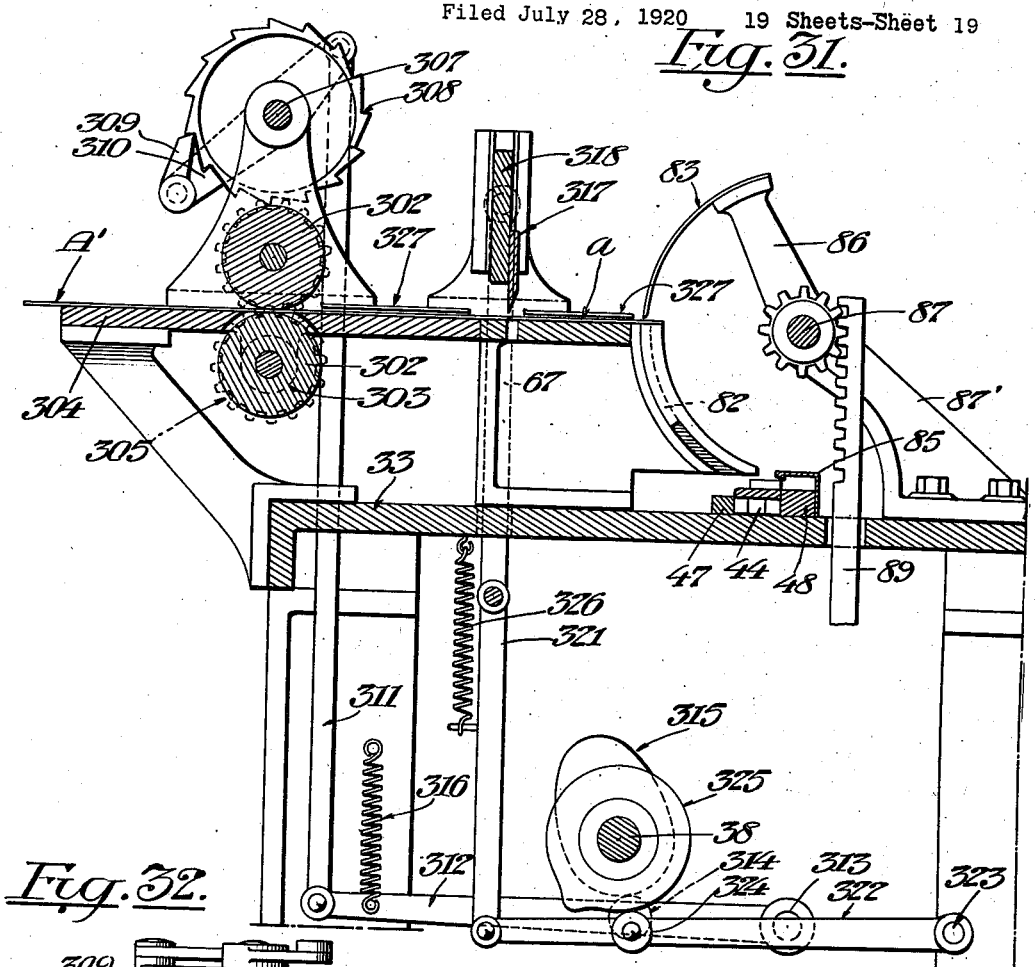

Patented Sept. 18, 1923.

1,468,310

UNITED STATES PATENT OFFICE.

JOHN R. NOLAN, OF NEW YORK, N. Y., ASSIGNOR TO THE DIAMOND MATCH COMPANY, OF CHICAGO, ILLINOIS, A CORPORATION OF ILLINOIS.

MACHINE FOR MAKING MATCH BOOKS.

Application filed July 28, 1920. Serial No. 399,561.

*To all whom it may concern:*

Be it known that I, JOHN R. NOLAN, a citizen of the United States, and resident of the city of New York, in the county and State of New York, have invented certain new and useful Improvements in Machines for Making Match Books, of which the following is a specification.

This invention relates to machines for making so-called book-matches, having reference, more especially, to mechanism for combining cards of matches with their respective covers.

The general object of the invention is to provide a machine of comparatively simple construction whereby books, comprising associated match cards and covers, are rapidly, accurately and economically produced.

Specific objects, which I attain by various novel features of construction and operation, will hereinafter appear.

Briefly described, the organized machine herein disclosed to exemplify the principle of my invention, comprises an endless carrier to which covers, each having at its respective ends a folded and a flap portion, are delivered and thereby advanced in succeeding series; means whereby the flap portions of the covers are flexed downward during their progress; means whereby match strips, as produced by a match making machine, are positioned adjacent the path of the depending flap portions; means whereby the thus positioned strips are uniformly subdivided into rows of match cards; means whereby the cards of each row are delivered in alternate series to succeeding series of covers in the carrier and entered in the end folds of the covers; means whereby the associated cards and covers of each series are simultaneously fastened together as rapidly as the cards are delivered to the covers; means whereby the cover flaps are folded upon their respective match cards after leaving the fastening means; means whereby the free ends of the folded flaps are tucked under the fastened folds, and means whereby the books thus produced are discharged from the carrier.

The construction, organization and operations of the several means just referred to will be hereinafter described in detail, and the precise scope of the invention then be defined in the appended claims; it being understood that my invention is not limited to the specific form or forms of mechanism herein disclosed as the same may be widely modified in many respects within the principle of the invention.

In the drawings—

Figures 1, 1ª represent a front elevation of a book-match machine embodying a preferred form of my invention; an adjoining similar machine being indicated by the dotted lines at the right of Fig. 1.

Fig. 4 is a longitudinal vertical section of the said mechanism, as on the line 4—4 of Fig. 3.

Fig. 4ª is a view of the lower run of the main carrier, and adjuncts, including the device for bending and folding the cover flaps on said carrier.

Fig. 5 is a horizontal section of the said mechanism on a plane above the table, as on the line 5—5 of Fig. 1.

Fig. 6 is a similar section on a plane below the table, as on the line 6—6 of Fig. 1.

Figure 2:
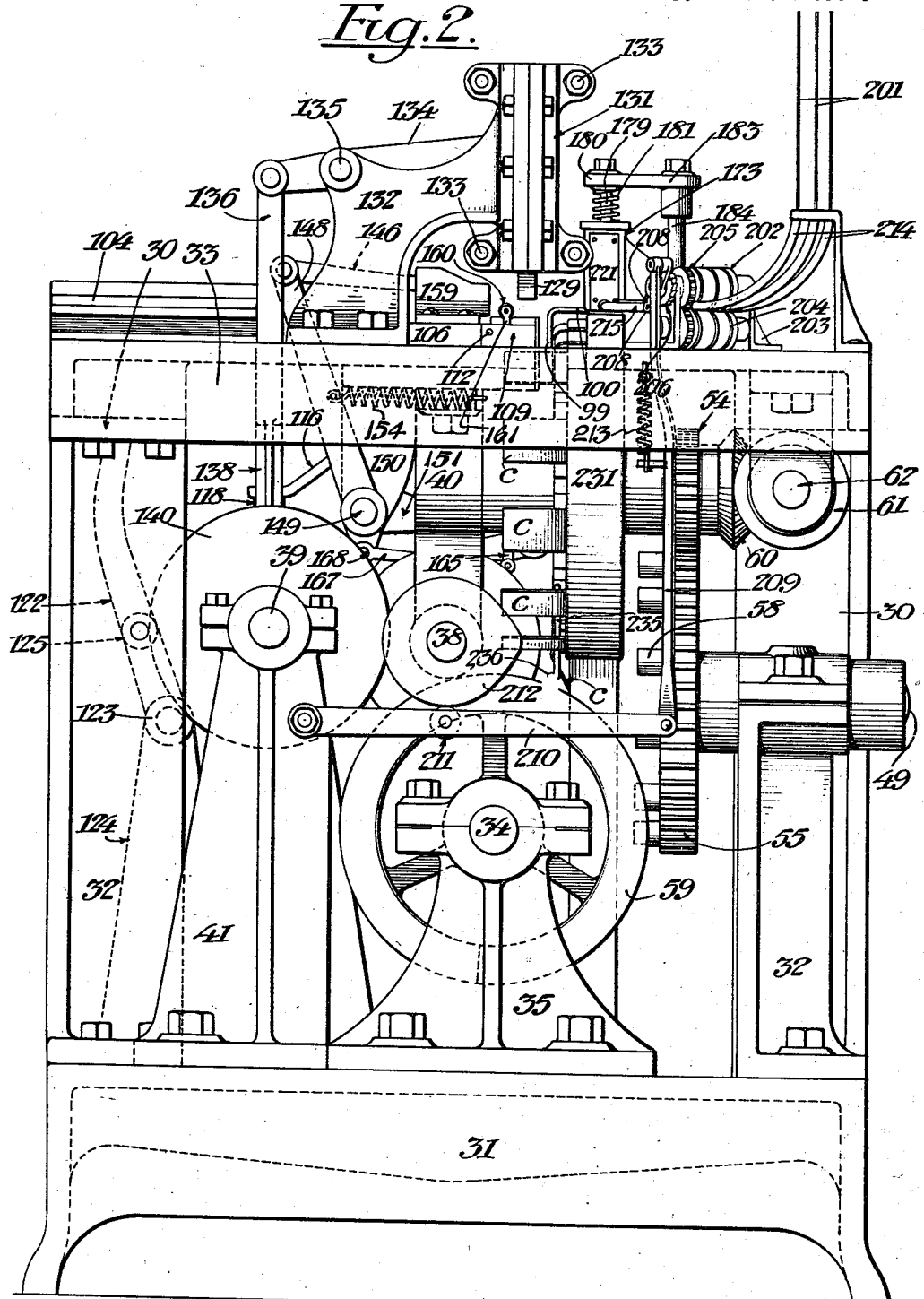
Fig. 2 is an end elevation of the machine, looking at the right-hand end of Fig. 1.
Figure 3:
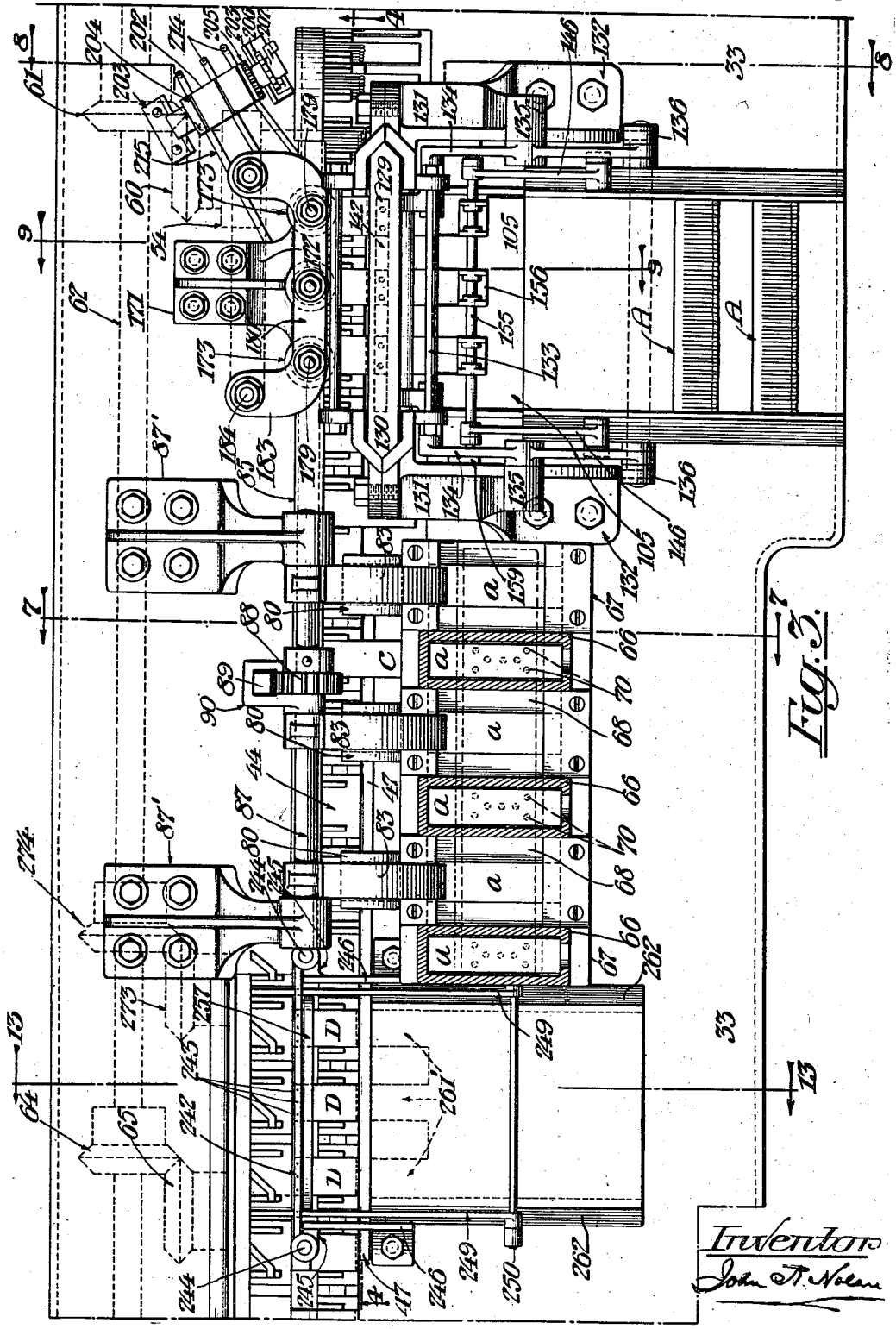
Fig. 3 is a plan of the mechanism shown in Fig. 1, the cover supply hoppers being in section.

Fig. 7 is a transverse vertical section through the cover feeding devices, as on the lines 7—7 of Figs. 3 and 6.

Figure 8:
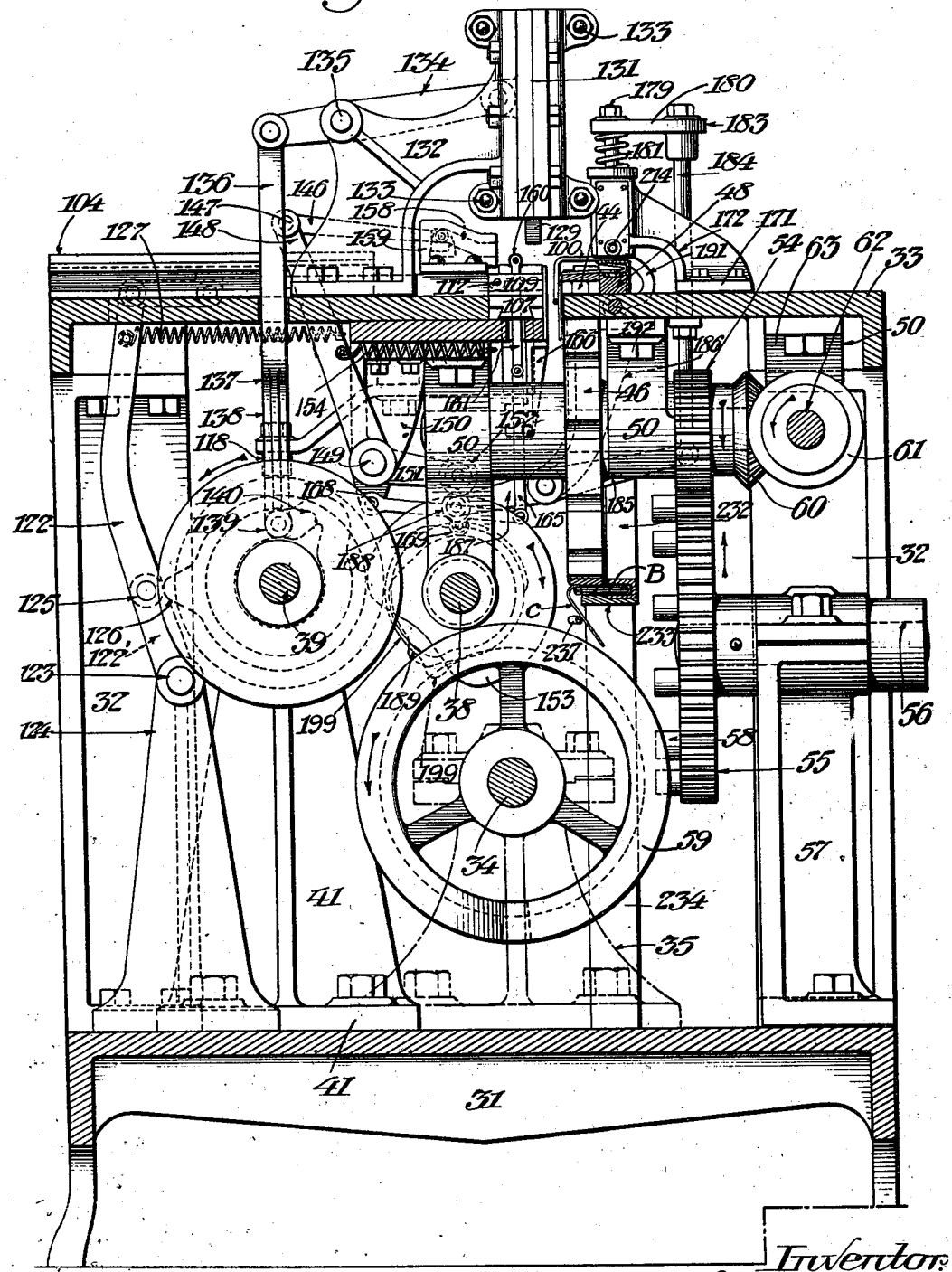

Fig. 8 is a transverse vertical section of the machine at the right of the strip-feeding and associated mechanisms, as on the lines 8—8 of Figs. 3 and 6.

Figure 9:
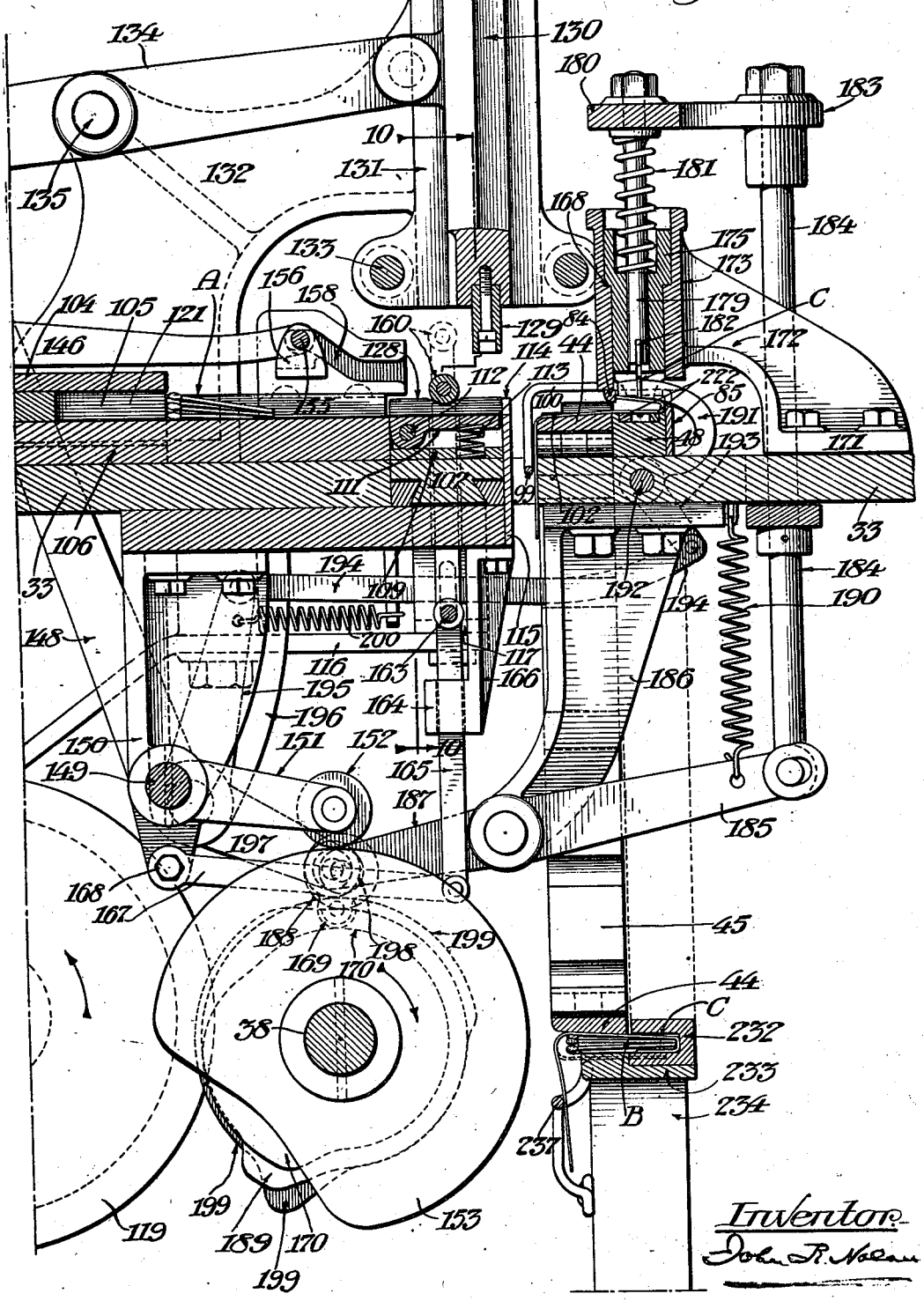

Fig. 9 is a similar section, enlarged, through said mechanisms, as on the line 9—9 of Fig. 3.

Fig. 10 is a partial vertical section through the strip-cutting and card positioning mechanisms, as on the line 10—10 of Fig. 9.

Fig. 11 is a sectional perspective view of a portion of the cover carrier, and adjuncts, including, amongst other things, the match-strip positioning carriage, and the devices for inserting divisions of the strips into the adjacent covers on the carrier.

Fig. 12 is a skeleton perspective view of the match-strip carriage, and adjuncts.

Fig. 13 is a transverse vertical section through the cover tucking and book transferring mechanisms, on the line 13—13 of Fig. 3; the book holding and cover tucking bars being represented in raised position preparatory to their engagement with the cover.

Fig. 14 is an enlarged view of a portion of Fig. 13, showing the holding and tucking bars down and in engagement with the cover; the tucking bar being also in forward position.

Fig. 15 is a similar view showing the tucking bar in back position, just prior to the lifting of the two bars.

Figure 16:
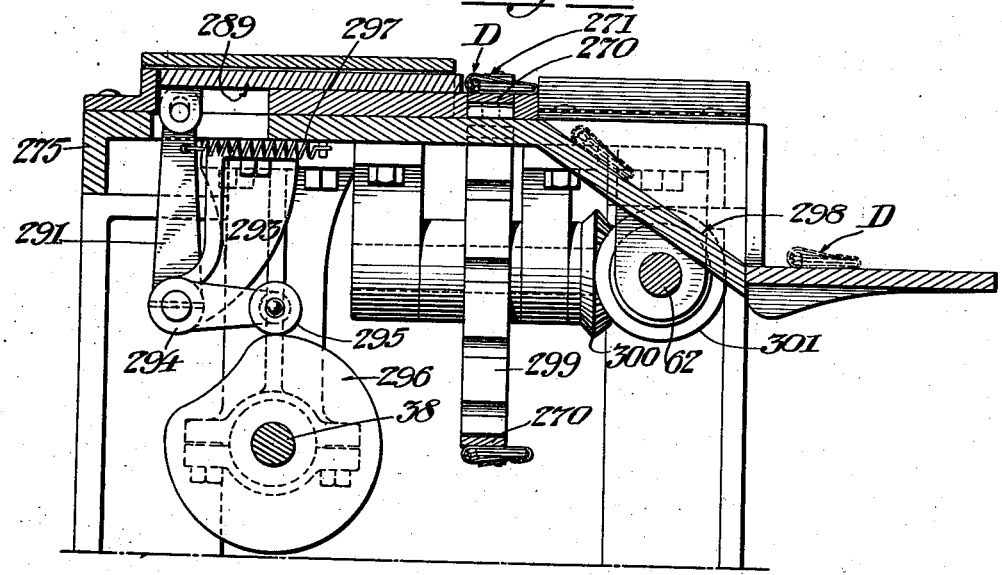

Fig. 16 is a transverse vertical section of ejecting devices for the completed bookmatches, as on the line 16—16 of Fig. 1ª.

Figure 17:
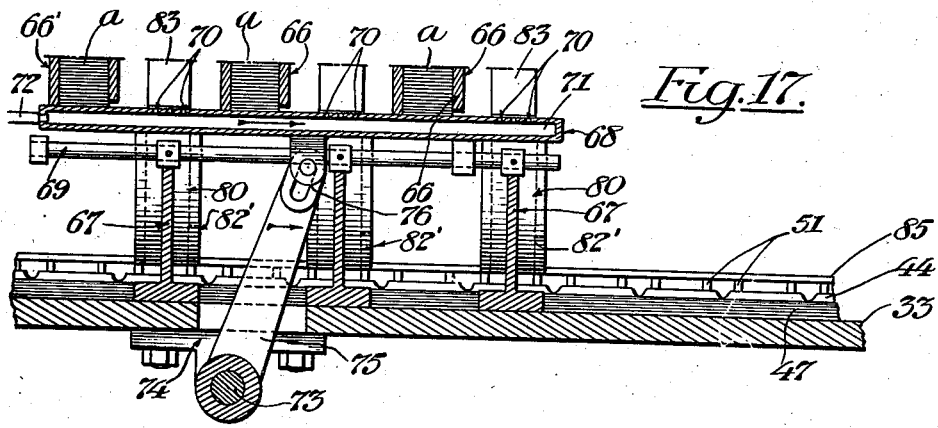

Fig. 17 is a partial vertical section through the cover supply hoppers and their cover-feeding slide, as on the line 17—17 of Fig. 7.

Figure 18:
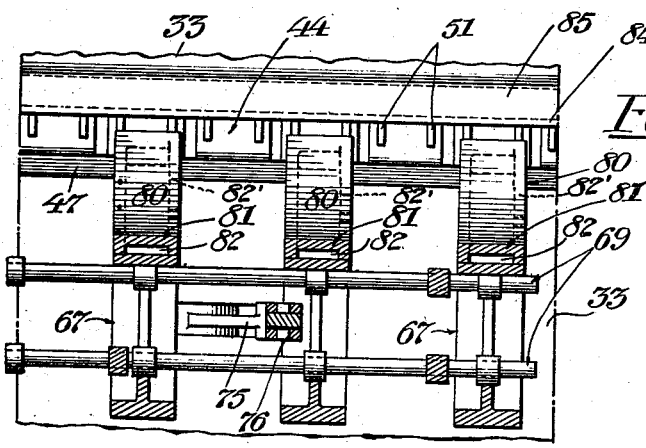

Fig. 18 is a partial horizontal section below the cover-feeding slide, as on the line 18—18 of Fig. 7.

Figure 19:
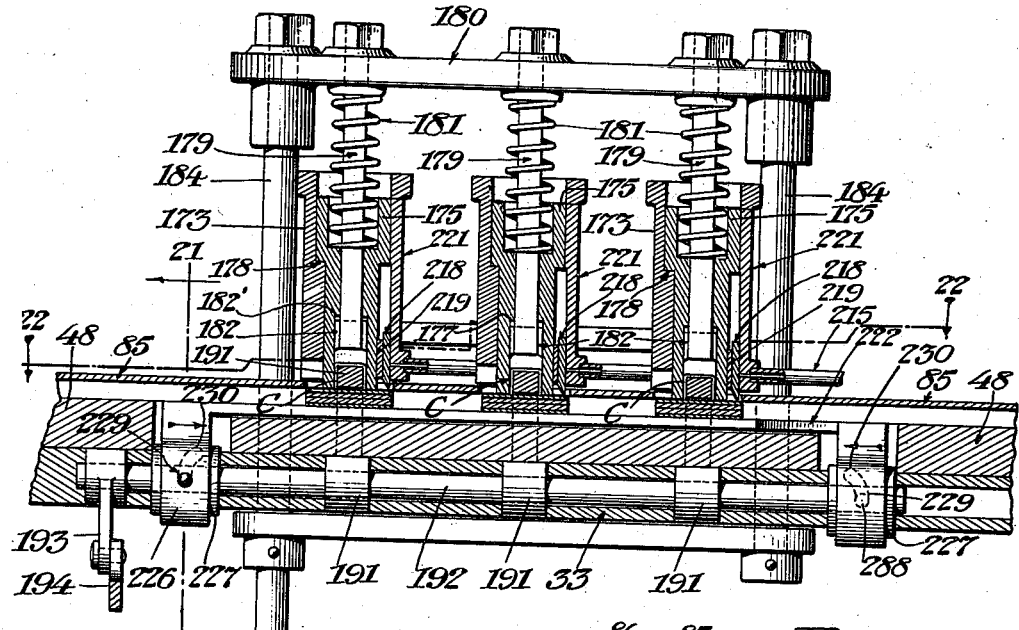

Fig. 19 is a vertical section through the staple-forming and clinching devices, the parts being shown in the relative positions that they occupy immediately upon the formation of the staples.

Figure 20:
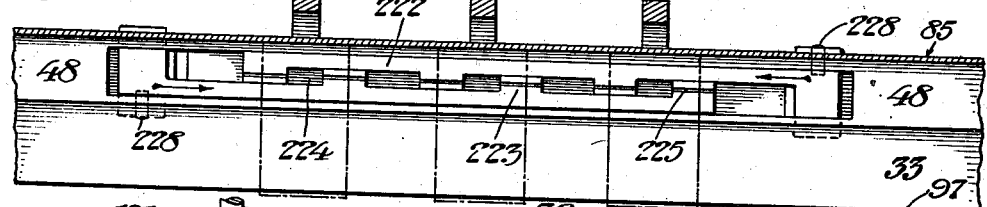

Fig. 20 is a horizontal section through the book-guiding path at the stapling machine, showing the clinching bars in plan, and the forming anvils in section.

Figure 21:
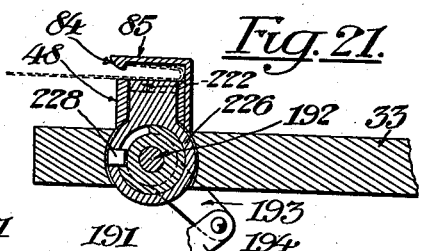

Fig. 21 is a transverse section through the clinching bars and one of their operating devices, as on the line 21—21 of Fig. 19.

Fig. 22 is a horizontal section through the head of the stapling machine, as on the line 22—22 of Fig. 19, showing the plural casings and their respective plungers, together with the wire guiding tubes.

Fig. 23 is a detail perspective of one of the wire-cutters and its guide plate.

Fig. 24 is a similar view of a wire-cutter.

Fig. 25 is an end elevation of a pair of wire feeding rolls, and adjuncts.

Fig. 26 is a transverse section of said rolls.

Fig. 27 is a section of the lower end of one of the plunger casings of the staple machine, showing the forming anvil as overlying a book of matches and the wire as positioned on the anvil preparatory to the descent of the cutting and forming devices.

Fig. 28 is a similar view showing the wire as cut and the staple as formed about the anvil.

Figures 29, 30:
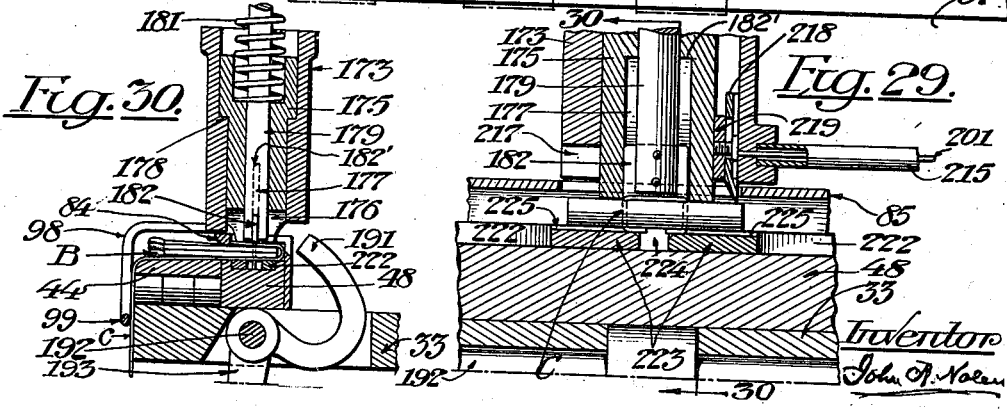

Fig. 29 is a similar view, including the adjacent portions of the clinching bars, the staple being shown as driven and clinched.

Fig. 30 is a transverse section, as on the line 30—30 of Fig. 29, showing the position of the anvil when the staple is being driven.

Fig. 31 is a vertical section of a modified form of cover blank feeding mechanism.

Fig. 32 is a plan of the same.

Referring to the drawings, 30 designates a suitable supporting frame comprising a bed 31, standards 32, and a table 33.

34 designates a main power-driven shaft extending longitudinally of the frame, which shaft has its bearings in boxes supported by standards 35 on the bed; 36 designates a suitably-disposed electric motor appropriately geared with the shaft 34, and 37 designates a clutch of any usual or approved type whereby the motor gear connection with the shaft can be rendered fast or loose at will.

38, 39 designate two secondary shafts arranged in parallelism to the main shaft, and having their bearings in suitable brackets 40 and standards 41, respectively, on the main frame. The shafts 38, 39 are driven from the main shaft through appropriate gearing comprising, in the present instance, two gears 42, 43 on the shaft 38 in mesh with gears 42', 43' on the shafts 34, 39, respectively.

An endless chain of links, 44, constituting a cover and card carrier, passes about sprocket wheels 45, 46 at the respective ends of the bed; the upper horizontal run of the chain traveling along the top of the table, and being guided throughout its length by spaced parallel rails 47, 48 on the table. The shafts 49 of the sprocket wheels have their bearings in suitably-disposed hangers 50 beneath the table. Each link of the carrier, in the form illustrated, comprises a body having at or adjacent its ends outwardly projecting walls 51 between which a cover blank in flat position can be freely placed, and having also perforated ears 52 by means of which the adjacent links are hingedly connected by pivot pins 53. The forward ends of the walls 51 terminate somewhat short of the forward edge of the link to provide a front marginal portion for a purpose which will be presently explained.

The ears of the respective links are constructed and arranged to register with the succeeding peripheral spaces of the sprocket wheels during the rotation of the latter. These wheels are actuated in a manner to effect an intermittent travel of the carrier; the extent of each movement being, in the present instance, equal to the length of three links. Any other appropriate form or type of carrier may be employed, and so also may any suitable means be adopted for actuating the carrier. In the present illustration, the shaft 49 of the sprocket wheel 46 is provided with a pinion 54 in mesh with a spur wheel 55 on an underlying stud shaft 56 having its bearing in a standard 57 on the bed 31. On one face of this spur wheel is a circular series of equally spaced pins 58 with which successively engages a cam 59 on the main shaft; the contour of the cam groove being such that the spur wheel is intermittently advanced step-by-step, the impulse occurring during approximately one-half of the rotation of the main shaft and the dwell during the remainder of the rotation. The ratio of the gearing is such that the requisite movement of the carrier is transmitted thereto during each step of the wheels 54, 55. In order to ensure uniform intermittent rotation of both sprocket wheels 45, 46, and corresponding advancement of the carrier, the shaft of the wheel 46 is extended rearwardly and is provided with a bevel gear wheel 60 in mesh with a similar gear 61 on a horizontal shaft 62 which has its bearings in brackets 63 on the underside of the table. The shaft 62 extends longitudinally of the table and toward the shaft of the sprocket wheel 45, and is provided with a bevel gear 64 in mesh with a similar gear 65 on the shaft 49 of the wheel 45.

The present machine has been especially designed to supply to succeeding series of links of the carrier previously-cut blanks of suitable form and dimensions for the covers of book-matches; although, in another aspect of the invention, the blanks may be successively severed from a roll or rolls of material preparatory to their introduction to the carrier, as will be hereinafter explained.

A preferred form of mechanism for feeding individual blanks to the carrier, is as follows; reference being had to Figs. 1, 3, 4, 7, 17 and 18 of the drawings.

A series of spaced-apart vertical hoppers 66 are supported by a bracket structure 67 rising from the table adjacent to the path of the upper run of the carrier. In this instance there are three hoppers, each of which is designed to contain a stack of cover blanks a. The bottoms of the hoppers are constituted by a common chambered slide 68 which is mounted on parallel guide bars 69 supported by the bracket structure. The portion of the slide movable beneath each hopper is provided in its upper surface with a series of through perforations 70 which communicate with the chamber 71 within the slide, which chamber is connected with a flexible tube 72 in communication with a suitable fan or air exhaust pump (not shown), whereby the chamber is evacuated and the lowermost blank of the pile in each hopper is thus held flat against the perforated portion of the slide contiguous thereto. Hence by reciprocating the slide to move its perforated portions under and beyond the respective hoppers, the lowermost cards are successively removed from the hoppers. The slide is preferably actuated by a single lever and cam connection. The lever is fulcrumed on a stud 73 supported in brackets 74 on the underside of the table; the upper arm 75 of the lever being pivotally connected with the slide, as at 76, and the lower arm 77 thereof being provided with a roll 78 in registry with the groove of a cam 79 fast on the shaft 38. The contour of the cam groove is such as to effect the oscillation of the lever to insure the timely bodily reciprocation of the chambered slide.

The inner side of the bracket structure 67 is formed with a series of downwardly and rearwardly curved surfaces 80 which are spaced apart to alternate with the hoppers 66. Upon each of these surfaces is bolted a segmental cover plate 81 which provides, in conjunction with the adjacent curved surface of the bracket, a curved passage 82, whereof the upper and lower ends and the lower portion 82' of one side are open. The open tops of the passages are so located that they are directly beneath the inner ends of the cover blanks when the latter are withdrawn from the respective hoppers by the suction slide.

Curved folding blades 83 corresponding with the curvature of the passages 82 are constructed and arranged to be swung into and from the respective passages. The blades in their downward stroke engage the opposing end portions of the blanks, and tuck them down into the proximate passages, thereby not only effecting the folding of such end portions, (as at b) but also carrying the blanks bodily through the curved passages and setting the blanks within a series of spaced links of the endless carrier. When the blanks are thus positioned in the carrier the blades are simultaneously swung upward from the passages, the folded blanks being retained in the links of the carrier. (See Fig. 7.)

The retraction of the folded blanks by the up-swinging blades is prevented by a depending lip or shoulder 84 at the mouth of a longitudinal guide channel constituted by a bar 85 which is secured to the rearward rail 48 so as to overhang the same longitudinally of and adjacent the upper run of the carrier. When the folded portions of the covers are entered in the channel, the free ends of such portions, springing upward, take against the lip or shoulder 84. The bar 85 extends from the cover station to the right hand end of the machine, so as to maintain the end folded covers in place during their progress with the carrier.

The blades 83 are carried by radially extending arms 86 on a rock-shaft 87 which has its bearings in spaced-apart brackets 87' rising from the table. On this shaft is a pinion 88 in mesh with a vertically-reciprocative rack-bar 89 which depends through and below the table, and is guided in suitably-disposed bearings 90, 91, respectively. The lower end of the rack is jointed, as at 92, to the free end of a rock-arm 93 which is loosely mounted on the forward shaft 39. This arm overhangs the shaft 38 and is provided with a lateral roll 94 in engagement with the groove of a cam 95 fast on the shaft 38, the contour of the groove being such that the arm 93 is periodically oscillated to effect the vertical reciprocation of the rack and, consequently, the oscillation of the pinion 88 and its rockshaft 87. Thus the folding blades are swung into and from the respective passages 82.

When the blades are in their up-position, as seen in Fig. 7, the suction slide is actuated to move the cover blanks $a$ from the respective hoppers and beneath the blades. The slide remains at rest for a brief interval, and is then retracted to dispose its perforated portions within the respective hoppers. This reciprocative operation of the slide takes place during a movement of the carrier. In the succeeding dwell of the carrier the folding blades are swung downward to position the cover blanks in the carrier, and are then returned to their previous upward position in readiness to act upon the next succeeding covers presented thereto by the slide.

As previously mentioned the carrier, in each movement thereof, travels a distance of three links. The cover blank hoppers are in such spaced relation to each other that during each dwell of the carrier three folded covers are inserted in three alternate links of the carrier. In each succeeding dwell of the carrier, the unfilled links adjacent the respective folding blades are supplied with folded covers, and hence when each succeeding link passes beyond the cover inserting devices, excepting upon the first movement of the carrier, the link is supplied with a folded cover.

Upon the initial movement of the carrier, the second link beyond the right hand side of the cover supplying devices is unfilled; but by manually removing the cover from the adjacent leading link each of the succeeding links will thereafter be supplied with the folded covers as the intermittent travel of the carrier continues.

In each movement of the carrier, succeeding the insertion of the folded covers in the latter, the forwardly extending flap portions ($c$) of the covers pass through the open sides 82′ of the respective passages 82 and resume a substantially horizontal position below the latter; the bracket structure 67 being recessed, as at 96, to permit the unobstructed travel of the covers with the carrier.

As the filled links pass from the cover station the forwardly extending cover flaps are successively bent downward at right angles or substantially so to the horizontal; the table being suitably cut away, as at 97, to permit this to be accomplished.

A simple and efficient means for thus flexing the succeeding covers, and maintaining them in that condition for an extended part of the travel of the upper run of the carrier, comprises a strip of material, preferably a piece of wire, which is bent and arranged to provide a downwardly-inclined cam portion 98 adjacent the cover supplying devices, and a lower portion 99 extending in parallelism with and below the forward edge of the carrier; the ends of the wire being bent, as at 100, to overhang the carrier and terminating in eyes 101 which are affixed to the longitudinal stop bar 85. (See Figs. 4, 5, 10 and 11.)

When the covers contained in the carrier leave the cover station, their forwardly extending flaps successively impinge against the inclined portion 98 of the wire and are thus bent downward in a manner to lie between the wire and the carrier; and as the carrier progresses the portion 99 of the wire maintains the succeeding cover flaps in depending condition.

To obviate any liability of the covers being displaced or buckled on the carrier links, not only while the flaps are being downwardly bent but also while they are being advanced in that condition, there is provided a light spring strip 102 which extends longitudinally of and in close relation to the forward marginal portion of the carrier links beyond the end walls 51. That end of the strip adjacent the incline 98 of the wire comprises an upwardly and rearwardly bent portion 103 which overhangs the carrier and is fastened to the bar 85; the opposite end of the strip being free. Thus the covers pass to and progress beneath the strip against its inherent elasticity, and finally escape therefrom at its free extremity; the cover flaps at or about the same time passing beyond the wire portion 99 and resuming a substantially horizontal position.

The covers, with their flaps bent down as above described, are advanced by the carrier to mechanisms whereby match strips are subdivided into cards of proper size; whereby the cards are inserted into the succeeding covers in the carrier, and whereby the associated covers and cards are fastened together. The performance of these plural operations at one station is an important feature of my invention as thereby all liability of the accidental displacement of the associated cards and covers, relatively to each other, is obviated. The downward flexing of the cover-flaps is also a feature of importance, since thereby the match strips can be disposed in proximity to the forward edge of the carrier, preparatory to the subdivision of the strips into match cards, thus providing for a minimum range of movement of the cards to associate them with the covers contained in the carrier, and, in consequence, reducing liability of displacement of the cards in respect to the covers during such movement.

The preferred co-related mechanisms whereby the cutting, inserting and fastening operations are rapidly and effectively accomplished in proper sequence will now be described.

104 designates a suitably-disposed feed-table upon which full-length match strips, (A, Fig. 3) as produced by a match-making machine, are deposited by an attendant, and thence manually fed to and upon an underlying reciprocative slide 105 (hereinafter described) which, in turn, delivers them to and upon a horizontal bed 106. This bed is supported on the main table and in spaced relation to that portion of the front of the carrier in which the covers with downwardly-bent flaps are contained.

Where each match book to be produced comprises a single card of matches, the strips are fed individually to the bed 106, but where, as in this case, each book contains two superposed cards, two strips placed one upon another are fed to the bed. The strips thus imposed on the bed extend longitudinally of and parallel to the carrier, or substantially so.

Slidably mounted in a longitudinal guide-way in the table, at the rear of the bed 106, is a strip-supporting element which occupies the space between the bed and the forward side of the longitudinal opening 97 through which the cover-flaps depend. (See Figs. 8 to 13, inclusive.) This element, in its preferred form, is constituted by a carriage comprising a base bar 107 having a longitudinal dove-tail sliding connection 108 with the table, and a top bar 109 which is fastened to and is movable with the base bar. The top of the bar 109 is flush with the upper surface of the bed, and is provided with a series of transverse channels 110 which are each equal in width to a match card and are spaced-apart correspondingly with a succession of links of the carrier. In the present illustration three channels are employed. Each channel has a vertically-movable cover plate 111 which neatly and slidably fits within the mouth of the channel. The forward end of the plate is pivoted on a pin 112 in the bar 109, and the rearward end of the plate is yieldingly supported by means of a suitably-disclosed spring 113 which maintains the top of the plate normally flush with the top of the bar 109. At the rearward edge of the carriage are the spaced up-standing portions 114 of a recessed plate 115 which is secured to the table, such portions alternating with the channels 110.

Provision is had whereby the carriage is periodically reciprocated longitudinally in a path equal in length to the width of a match-card, for a purpose hereinafter explained. A preferred means for thus actuating the carriage comprises a horizontally movable lever 116, one arm of which is jointed to an angular bar 117 extending from the inner end of the carriage. The other, or forward, arm of the lever bears a roll 118 which registers with the groove of a cam 119 on the shaft 39; the contour of which groove is such that during each rotation of the cam the lever is controlled and actuated thereby to maintain the carriage at rest for a stated interval of time; then to move the carriage longitudinally a distance equal to the width of a match card, then to maintain the carriage at rest in that position for a stated interval of time, and then to return the carriage to its first position. (See Figs. 1, 5, 6, 10 and 12.)

In the present instance each match-strip (A) is of such length that it can be uniformly subdivided into six match cards (B). A pair of superposed strips, heads forward, placed upon the bed 106 as previously described, are pushed rearward by the action of the slide 105 which is mounted to reciprocate between the feed table and the bed 106 and toward and from the carrier. This slide is provided with three rearward alternating projections 120 and spaces 121, the latter being in horizontal alinement with the chambers of three carrier links when the carrier is at rest.

The forward portion of the slide is connected by means of a link with the upper end of a lever arm 122 rising from a rock-shaft 123 having its bearing in a standard 124 on the frame bed 31. Fast on the rock-shaft is an arm 122' provided with a lateral roll 125 which is yieldingly held in operative contact with a cam 126 on the shaft 39 by means of a spring 127 connecting the arm 122 with a pin depending from the table; the contour of the cam being such that at the proper time the slide is positively moved forward and beneath the feed-table, and is then yieldingly moved rearward by the action of the spring 127 on the arm 122. In its forward movement the slide is withdrawn from the match strips previously placed thereon, which strips thereupon drop upon the bed 106 and in rear of the slide. In its yielding return travel the slide pushes such strips to and upon the top of the carriage, longitudinally of the latter, the up-projecting portions of the stationary plate 115 serving as stops to determine the rearward position of the strips on the carriage. The strips are thus uniformly delivered to the carriage and are accurately positioned thereon between the stops 114 and the slide; which slide, in a succeeding rotation of the shaft 39 and the cam 126, is again reciprocated to feed a succeeding pair of match strips in like manner to the carriage, and so on. Preferably the top of the carriage is provided adjacent its respective ends with transverse blocks 128 which serve as end stops and guides for the match strips on the carriage.

Immediately upon the positioning of the strips on the carriage, they are uniformly subdivided at their marginal portions into six pairs of cards suitable for match books, by the action of a series of vertically-reciprocating cutters which are constructed and arranged to impinge against those portions of the strips that are imposed on the yielding supporting plates 111 of the carriage. These cutters comprise blocks 129 affixed to the lower end of a vertically-reciprocative plunger 130 which is mounted in suitable guide-ways. In the present instance the guide-ways are formed in a frame head 131 supported by spaced-apart standards 132 on the table, which standards are connected by stay rods 133 to provide a rigid and substantial frame structure. The plunger is pivotally connected at its respective sides to the rearward arms of a pair of forwardly-projecting levers 134 which are fulcrumed on the adjacent standards, as at 135. The forward arms of the levers are jointed to the spaced vertical members 136 of a vertically-reciprocating yoke-frame, the body 137 of which lies beneath the table while the members 136 thereof are guided in openings in the table. This yoke-frame has a centrally depending arm 138 bearing a roll 139 in registry with the groove of a cam 140 fast on the shaft 39; the contour of which groove is such that in an interval of rotation of the cam the yoke-frame is rapidly reciprocated in a manner to lower and raise the plunger and its cutters, and then, during the remainder of the rotation, to maintain the yoke-frame in down position and the cutter-plunger raised. (See Figs. 1, 2, 3, 8, 9, 10 and 12.)

In the descent of the plunger the cutters 129 depress the opposing marginal portions of the strips and their supporting plates 111 against the action of the springs 113, the edges of the cutters contiguous to the upper edges of the channel walls, co-operating with the latter to shear the margins of the strips transversely, and thus to subdivide the strips uniformly into six pairs of match cards. Preferably the cutting edges of the channel walls are constituted by suitably-disposed steel insets 141 on the bar 109. When the cutters 129 are raised, the plates 111 resume their normal position and the depressed cars are simultaneously raised to the level of the alternating cards on the body of the carriage.

During the cutting operation the marginal portions of the strips alternating with the yielding supporting plates 111 are held squarely and firmly in place by means of yielding blocks 142 which are slidably fitted in recesses in the lower end of the plunger 130 so as to depend slightly below the cutters 129. Extending centrally through each of the blocks 142 is a screw pin 143 which is secured to the plunger, the head of the pin being contained in a socket 144 in the underside of the block. A spring 145 encircling the pin and bearing against the block 142 and the roof of its recess, maintains said block normally depressed. (See Fig. 10.)

Upon the initial descent of the cutter-plunger, the spring-pressed blocks 142 impinge against the opposing marginal portions of the match strips, and then the cutters 129, as the descent of the plunger continues against the action of the springs 145, effect the severance of the marginal portions of the match strips. In the initial ascent of the plunger, the blocks 142 remain in yielding contact with the cards until the cutters have cleared the latter, such blocks thus performing the function of "strippers" to prevent the accidental upward movement of the match cards.

When the strips have been severed into match cards as above described, the position of the carriage in relation to the carrier is such that the cards supported by the movable plates are in proximity to and in alinement with three successive links of the carrier while the latter is at rest. These three cards are then pushed endwise into the chambers of the adjacent links and upon the contained covers by suitable feeding devices which are preferably of the following construction, reference being had, more especially, to Figs. 1, 2, 3, 5, 8, 9 and 11 of the drawings.

A pair of spaced-apart rearwardly projecting arms 146 are pivoted at their forward ends, as at 147, to the upper ends of a pair of rock-arms 148 rising from a rock-shaft 149 having its bearings in hangers 150 beneath the table. These rock-arms project through appropriate slots in the table. On the rock-shaft is a rearwardly extending arm 151 bearing a roll 152 which is maintained in operative contact with a cam 153 on the shaft 38 by means of a spring 154 which connects one of the arms 148 with a pin depending from the table. The contour of the cam is such that during about three quarters of its rotation the arm 151 is held in raised position, thus maintaining the arms 146, 148 retracted, and that during the remainder of the rotation the latter arms are moved rearwardly toward the carrier and back again. The rearward ends of the arms 146 overhang the bed 106 and are rigidly connected by a tie-rod 155 upon which are secured a series of depending pusher members. These members preferably comprise depending heads 156 of which there are three in the present instance, spaced apart correspondingly with the spaces 121 of the slide 105, so that during the reciprocation of the heads toward and from the carrier the heads can enter the spaces 121 in alinement therewith. The ends of the rod 155 are extended beyond the arms 146 and are provided preferably with rolls 157 which are so disposed that as the arms 146 approach the limit of their forward movement the rolls enter cam-ways 158 formed in upstanding brackets 159 at the respective ends of the bed; the contour of the cam-ways being such that the arms 146 in their continued forward movement are raised and the heads 156 are lifted thereby above the path of the slide 105.

The cams 119, 126 and 153 are so co-ordinated that when the match strips have been positioned on the strip-supporting carriage and have been subdivided thereon as previously described, the arms 146 are moved rearward, in which case the heads 156 are first caused to descend by the action of the cam-ways 158, upon the bed 106 and within the respective spaces of the slide 105, and then to continue their travel across the carriage and in close relation to the cover carrier 44. In such continued travel of the heads 156 they contact with the opposing ends of the match cards on the carriage and transfer such cards to the respective links of the carrier in alinement therewith. The cards are thus pushed a relatively short distance and imposed flatwise upon the covers contained in the respective links, the marginal portions of such cards entering the folded portions (b) of the covers beneath the bar 85; whereupon the associated cards and covers are bound together by suitable marginal fastening mechanism hereinafter described. This being done, the arms 146 and their heads 156 are retracted to their previous forward and upward position, the slide 105 remaining temporarily rearward.

When the heads in their forward movement clear the carriage, the latter is moved longitudinally (i. e., to the right) to position the remaining cards on the carriage in front of the next succession of links of the carrier when it is advanced. At this juncture the heads 156 are again moved rearward, the opposing cards are pushed thereby into the adjacent links and upon their contained covers, and the associated cards and covers are fastened together as before. The heads are again retracted to their forward and raised position; the carriage is returned to its first mentioned position, and the slide is rapidly reciprocated in a manner to present succeeding match strips to the bed and deliver them to the carriage preparatory to a repetition of the sequence of operations just described.

During the feeding of the first set of cards upon their complementary covers in the carrier, endwise rearward movement of the adjacent or second set of cards on the carrier is prevented by the spaced stops 114; which stops, also serving as guides for the contiguous longitudinal edges of the respective cards as the latter are being introduced in the carrier, contribute to the accurate disposition of the cards upon the covers in the carrier In order primarily to prevent accidental displacement of the second set of cards during the longitudinal positioning movement of the carriage, suitable card retaining means is provided. (See Figs. 3, 5 and 6 and 8 to 12 inclusive.) Such means, in the preferred form illustrated, comprises a vertically movable roller 160 extending longitudinally of and overhanging the carriage. The roller is supported at its ends by and between a pair of depending bars 161 which are slidably mounted in vertical guide-ways 162 at the respective ends of the carriage, so as to depend below the table. The lower ends of these bars are rigidly connected by a tie-rod 163, thus providing a substantial frame structure. This rod extends slidably through a horizontal guide-member 164 on the upper end of a vertical plunger 165 supported by a guide-bracket 166 depending from the table. The lower end of the plunger is jointed to a forwardly extending rock-arm 167 which overhangs the shaft 38 and is pivoted to a lug on the adjacent hanger 150, as at 168. The arm is provided with a lateral roll 169 which is maintained in contact with a cam 170 on the shaft. The contour of the cam 170 is such that, in a part of its rotation, the arm 167 and therewith the plunger 165 and the roller-bearing frame constituted by the bars 161 and the tie-rod 163, are raised immediately before, and are so maintained during each reciprocation (back and forward strokes) of the heads, thus permitting the latter to pass freely beneath the raised roller 160. In the remainder of the rotation of the cam the roller occupies its down position. The roller is in this position when the strip is being delivered to the carriage, and hence the strip passes beneath the roller, and the yielding match splints are thus depressed and clamped. The roller is also in this down position during the longitudinal movements of the carriage, and hence in the stroke of the carriage (from left to right) to position the second set of spaced cards for delivery to the links of the carrier, such cards are securely held and accidental displacement thereof is prevented.

By the construction just described the frame and its roller are shifted bodily to and fro by the carriage. In the present instance, the roller is maintained in operative contact with the cam by the gravity of the associated movable parts, but, if desired, an assisting spring may be used.

The novel feature of subdividing full-length match-strips into uniform match-cards at a single operation, and thereafter introducing two groups or series of alternating cards into the carrier in successive order, as hereinbefore described, is an important one, which contributes materially to increased production.

Preferably the fastening means for the associated cards and covers is constituted by wire stitching mechanism.

The form of stitching mechanism herein illustrated comprises a supporting structure for a series of staple forming and driving instrumentalities which are so co-ordinated and related to each other and to the carrier and its actuating devices, that, immediately upon the insertion of a series of cards in the covers borne by the carrier as hereinbefore described, wire staples (C) are formed and driven down into and through the respective associated covers and cards. The stapling mechanism also comprises devices whereby the downwardly protruding ends of the legs of the staples thus driven are simultaneously clinched against the under side of the covers in a manner to complete the stitching operation. (See Figs. 2, 3, 4, 5, 8 and 9 and 19 to 30 inclusive.)

The supporting structure embodies a base 171 having a forwardly extending portion 172 which overhangs the rail 48 in proximity to the card inserting station, said portion 172 including a series (in this case three) of vertical guide casings 173 which are disposed directly above and centrally of the folded ends of the covers borne by the carrier links at said station. The lower ends of the guide casings are bifurcated or recessed and are arranged to bridge suitably-spaced openings 174 in the bar 85. (See Fig. 19.)

Slidably mounted in each of the guide casings is a hollow plunger 175, termed a staple-forming plunger, having a bifurcated lower end portion 176, the spaced apart depending members of which are vertically grooved in their inner sides, as at 177. The space between the inner sides of the members is substantially equal to the length of a staple between the legs of the latter, the grooves being properly proportioned to receive and support such legs when a staple is formed and positioned between the members. Each plunger 175 is provided with a shouldered portion 178 which co-acts with a shoulder in the casing to limit the descent of the plunger.

Guided within each of the hollow plungers 175 is a plunger 179, termed a staple driver, the upper end of which extends above the associated plunger 175 and is affixed to a vertically reciprocable normally elevated yoke-bar 180. A spring 181, seated in the upper portion of the plunger 175, and encircling the plunger 179, presses against the plunger 175 and the bar 180.

The lower end of each plunger 179 is equipped with a transverse inset blade 182, the vertical laterally projecting edges of which provide feathers which are slidably fitted in the grooves 177 of the hollow plunger 175, the upper ends of the feathers being arranged to take against an opposing shouldered portion 182' of the plunger 175 and thus maintain the latter normally elevated correspondingly with the central plunger 179. The strength of the spring 181 is such that when the plunger 179 is depressed the latter and its associated plunger 175 are concurrently moved until the descent of the plunger 175 is arrested, whereupon the descent of the driven plunger 179 continues in opposition to the force of the spring. Upon the elevation of the plunger 179 the plunger 175 is raised thereby.

The three plungers 179, being fixedly united by the yoke-bar, are movable as a unit. In the present instance the bar is provided at its ends with rearward extensions 183 to which are secured the upper ends of a pair of spaced guide-bars 184 which depend through guide openings in the table. The lower end of one of the bars 184 is prolonged and is connected with one arm 185 of a rock lever which is fulcrumed on a hanger 186 on the table; the other arm 187 of which lever carries a roll 188 that is maintained in operative contact with a suitable cam 189 on the shaft 38, by the action of a spring 190 which is secured to the lever and the table, whereby during the rotation of the shaft the lever is actuated to effect the requisite reciprocation of the bars 184 and ensure the timely operations of the staple forming and driving plungers connected therewith. (See Figs. 4, 6, 9 and 19.)

Reciprocable into and from the bifurcated lower ends of the casings 173 are anvil members comprising hook-shaped arms 191 which are fast to a rock-shaft 192 journaled in the table. The upper or free end of each of the arms 191 is preferably rectangular in cross-section, its width being substantially equal to the open space in the bifurcated foot of the adjacent plunger 175, whereby the latter in its descent embraces the arm when the arm is positioned to overhang an opening 174 in the bar 85.

The shaft 192 is provided with a depending arm 193 which is connected by a link 194 with one arm 195 of a bell-crank lever fulcrumed on a hanger 196 under the table. The other arm 197 of the lever carries a roll 198 which bears upon an appropriate cam 199 fast on the shaft 38. A spring 200 secured to the arm 195 and to a pin depending from the table maintains the roll in operative contact with the cam, whereby during the rotation of the latter the lever is timely actuated to effect the operation of the rock-shaft 192. (See Figs. 9, 11, 19, 20, 21 and 30).

Three strands of wire 201, from which staples are formed, are simultaneously fed to position the free ends of the strands upon the respective anvil arms 191 when the latter overhang the openings 174 of the bar 85, suitable means being provided whereby staple lengths are intermittently cut from the ends of the respective strands. These strands, which are drawn from a series of suitably-disposed reels, (not shown) pass through the bite of a pair of feed-rolls 202 which are mounted in and between supporting standards 203 on the table, the rolls being grooved at spaced intervals, as at 204, for the reception and guidance of the respective wires. The shafts of the rolls are provided at one end with intermeshing gear wheels 205, one of which has formed on or affixed to it a ratchet-wheel 206, with the teeth of which engages a pawl 207 carried by one arm of an oscillatory lever 208 loose on the adjacent feed-roll shaft. The other arm of the lever is connected by means of a link 209 with the rearward end of a rock lever 210 which underlies the shaft 38 and is pivoted to the adjacent standard 41 on the frame bed. The lever bears a roll 211 which is held in contact with a cam 212 on the shaft 38 by means of a spring 213 secured to the link 209 and the table; the contour of the cam being such that in a part of its rotation the lever 210 is gradually lowered, thereby lifting the pawl-bearing arm of the lever 208 in such a manner that the pawl advances the ratchet-wheel 206 and thus turns the feed rolls to effect the simultaneous feeding of the wires a predetermined distance. Thereupon the lever 210 is raised by the action of the spring 213 and the pawl-bearing lever is returned to its original position in readiness for a succeeding feeding operation. The wire feeding action occurs during the first part of each movement of the carrier.

The wires are guided to the feed rolls through individual guide tubes 214, thence progressing through guide tubes 215 which are suitably curved and positioned to terminate laterally of the feet of the respective guide casings 173. The sides of the latter adjacent the tubes 215 are perforated, as at 216, and the opposite sides are vertically slotted, as at 217, thus permitting the passage of the free ends of the wires transversely of the casings and above the respective anvils. When the wires are thus positioned staple lengths are severed therefrom by suitable cutters located at the sides of the respective casings. In the present instance each cutter comprises a blade 218 which is reciprocative vertically across the path of the wire where it enters the casing. This blade is supported by a channel piece 219 which is affixed to the foot of the plunger 175, and is vertically movable in a guide-way 220 in a detachable plate 221 on the side of the casing, whereby in the initial descent of the plunger 175 the piece 219 and its blade 218 are forcibly depressed in a manner to sever a staple length from the leading end of the wire. (See Figs. 2, 3 and 5, and 22 to 28, inclusive).

The wire-feeding, staple-forming and staple-driving devices above-described are so constructed, arranged and adapted to co-operate that during each interval of movement of the carrier the anvils are in their forward position and within the lower open ends of the guide casings; the feed rolls are actuated to feed the wires transversely of the casings and above the anvils, and the plungers 179 are partially depressed, thus similarly depressing the plungers 175 which in their initial movement actuate the cutters to sever staple lengths from the wires as previously explained, and then bend down the ends of the opposing wire lengths against the sides of the anvils in a manner to form staples whereof the legs are seated in the internal grooves of the respective bifurcated ends 176 of the plungers 175.

Initially of the period of rest of the carrier, when the strip-supporting carriage is in its normal position (i. e., at the left) the shaft 192 is partially rotated sufficiently to retract the anvils from the staples, and at the same time the slide 105 is actuated to feed a pair of match strips upon the carriage. During this interval the presser roller 160 is down as previously mentioned. The strip-cutter plunger 130 is then rapidly reciprocated so as to subdivide the positioned match strips into match cards, and the presser roller is raised and is thus maintained during a further interval of the period of rest of the carrier. During the latter interval the heads 156 are moved rearward to position a series of cards on their respective covers in the carrier, and are then retracted to their forward and raised condition in which they are maintained until the next succeeding period of rest of the carrier. Immediately upon the positioning of the cards on their respective covers the plungers 179 are sharply depressed against the action of the springs 181, in a manner to drive the legs of the opposing staples into and through the respective covers and their associated match cards, whereupon the protruding ends of the legs of the staples are clinched against the under sides of the respective covers by the agency of a pair of oppositely-acting clinching bars 222. The operations just described occur in sequence during each movement and dwell of the carrier.

As best seen in Figs. 19, 20, 21, 29 and 30, the clinching bars 222 are slidably arranged side by side in a longitudinal guide-way formed in the top of the guide rail 48 on the table, directly below the staple-driving devices, whereby the said bars can be simultaneously reciprocated in opposite directions to each other. The bars 222 are provided on their inner sides with clinching projections 223 which are arranged in alternation and in such spaced relation to each other that when the staples have been driven the legs thereof depend into the spaces 224 between the opposing projections of the respective bars. Hence when the bars are simultaneously moved inward the depending legs of each staple are bent toward each other and against the under side of the adjacent cover by the action of the projections 223, the tops of which are longitudinally recessed, as at 225, to receive the clinched staple legs. (See Figs. 20 and 29).

In the present instance, the opposite ends of the bars 222 are provided with depending bearing blocks 226 having circular openings within which are rotatably seated heads 227 on the adjacent ends of the rock-shaft 192. In each head is a circumferential groove into which extends a pin 228 fast in the proximate bearing block, said groove comprising a short straight portion 229 and an angular or cam portion 230. The cam portion in one head is reversely disposed to that in the other head, and hence during the oscillation of the rock-shaft 192 the two bars are simultaneously moved longitudinally in opposite directions to each other. When the rock-shaft is moved to shift the anvils to their partially retracted position, (seen in Fig. 30) the straight portions of the grooves remain in registry with the pins, but when the rock-shaft is still further turned backward, through the action of the cam 199 on the shaft 38, the cam portions of the grooves engage the pins and thus move the bars to effect the simultaneous clinching of the staple legs. In the succeeding movement of the rock-shaft 192 to project the anvils to their forward or active position, the grooves 230 act upon the pins 228 to shift the bars 222 and space apart their clinching members 223 in readiness for a succeeding clinching operation.

When the cards and covers are united as just described, the carrier 44 transports them beyond the stitching mechanism and to the tucking and ejecting mechanisms. To prevent the accidental displacement of such cards and covers during their travel, a guide therefor is provided, the same, in its preferred form, comprising two channeled segments 231 adjacent the respective sprocket wheels 45, 46, and a horizontal channeled bar 232 connecting the lower ends of such segments and extending adjacent the lower run of the carrier. The open end of the guide segment adjacent the stitching mechanism receives the stapled ends of the covers and cards immediately after they leave such mechanism. This segment, as well as the bar 232, throughout the greater part of the length of the latter, has associated therewith a rail 233 which is arranged to lie adjacent the path of the match cards and serve as a support therefor during their travel; the width of the rail being such that the heads of the matches project beyond its forward edge. The rail is sustained by standards 234 on the bed.

As the united cards and covers are being carried downward at the sprocket wheel 46, the forward flaps of the covers are successively flexed laterally outward in such a manner that when they reach the lower plane of the carrier the flaps depend downwardly and rearwardly and are thus permitted to continue their travel without interference by the cams and gearing on the shaft 38. When the cards and covers escape the end of the rail 233 the depending cover flaps are successively folded against the cards and are thus maintained until the associated cards and covers round the wheel 45 and reach the tucking and ejecting station. (See Figs. 3, 4, 6 and 9).

A simple and effective means for bending and folding the cover flaps comprises a strip of material, such as wire, having a curved portion 235 disposed adjacent to and laterally of the front of the periphery of the wheel 46 so as to permit the cover flap to pass under and against such portion. This portion curves downwardly and inwardly adjacent the wheel 46 so as to present a cam surface 236 to the cover flaps, and hence as the covers are impelled about the wheel their flaps are gradually deflected downward until, as they successively reach the bottom of the wheel, they depend downwardly and rearwardly in relation to the lower run of the carrier. The cam portion 236 of the wire merges with a horizontal portion 237 which lies adjacent to and parallel with the lower run of the carrier and the rail 233. The end of this portion 237 adjacent the free end of the rail 233 then merges with a portion 238 which inclines inwardly and upwardly toward the carrier and in close relation to the match cards, extending thence adjacent the path of the carrier about the wheel, as at 239, and overhanging the carrier at the tucking and ejecting station, as at 240. (See Figs. 4, 4ª, 31 and 32.) By this construction it will be seen that the portion 237 of the wire maintains the succession of cover flaps in depending condition during their travel until they escape the free end of the rail 233, whereupon the inclined portion 238 of the wire gradually folds the succeeding flaps up against the match cards. The portions 239, 240 of the wire respectively maintain the flaps thus folded as they round the wheel 45 and pass to position at the tucking and inserting station; the free ends of the flaps at that juncture overlapping the stapled end folds.

A preferred form of mechanism for tucking the ends of a series of folded cover flaps under the adjacent edges of the stapled folds of the covers and then ejecting the articles from the carrier will now be described, reference being had more especially to Figs. 1, 3, 4, 5, 13, 14 and 15 of the drawings.

242 designates a vertically-movable bar which longitudinally overhangs the stapled folds of the series of covers located at the tucking station when the carrier is at rest, the top of the guide-rail 48 at this station being preferably downwardly beveled or inclined, at at $x$. On the lower edge of the bar are sets of needle points 243 which, by vertical movement of the bar, are caused to enter or recede from the respective covers.

The ends of the bar are provided with vertically perforated ears slidably applied to up-standing pins 244 rising from lateral lugs 245 on a pair of bracket-arms 246 which extend rearwardly from the table and overhang the carrier. Springs 247 encircling the pins 244 and bearing against the heads of the latter and the ears of the bar, tend to maintain the bar yieldingly depressed.

The bar is transversely slotted adjacent its respective ends, as at 248, for the passage of a pair of horizontal bars 249, the forward ends of which are pivoted to a pair of arms 250 rising from a rock-shaft 251 having its bearings in spaced hangers 252 below the table. On the rock-shaft is a rearwardly-extending arm 253 bearing a roll 254 which is normally maintained in the path of a tappet block 255 on one face of a disk 256 fast on the shaft 38. Retracting springs 257' connecting the respective arms 250 to pins depending from the table, keep the arms 250 normally forward, and the roll of arm 253 in active relation to the path of the tappet block. Secured to the bars 249, in close parallel relation to the bar 242, is a bar 257, which, similarly to the bar 242, is provided with sets of depending needle points 258 which are arranged to overlie the flaps of the respective covers at the tucking station. The bars 249 are provided with laterally projecting studs or rolls 259 which register with corresponding cam-grooves 260 in the adjacent bracket arms 246, the contour of the grooves being such that when the bars 249 are longitudinally reciprocated, the grooves effect and permit the lowering and raising of the bars 249 and of the needle bearing bars 242, 257. When the tappet block impinges against and escapes the roll 254 of the arm 253 the latter is quickly raised and lowered, thus effecting, through the rock-shaft 251 and the arms 250, the requisite forward and back movements of the bars 249. In the initial forward and downward movement of the bars 249 the springs 247 press the bar 242 upon the underlying stapled folds, thus not only causing the needle points 243 to penetrate the surface of the folds in a manner to hold the books securely in place, but also pressing the opposing ends of the books downward upon the inclined surface $x$ of the rail 48, and canting upward the bodies of the respective match cards contained in the covers. Coincidentally the bar 257 is forcibly depressed and its needle points 258 are engaged with the opposing surfaces of the cover flaps, the bar 257 thus pressing down the canted portions of the match cards below the free edges of the stapled folds, which latter are firmly held in inclined position by the bar 242. See Figs. 13, 14 and 15. In the continued forward movement of the bars 249, the bar 257 pulls forward the free ends of the cover flaps beyond the adjacent edges of the stapled folds. This done the bars 249 are moved rearwardly, and in their initial rearward movement the bar 257 pushes the free ends of the flaps beneath the up-deflected edges of the stapled folds. As the rearward movement continues the two bars 242, 257 are raised to free the underlying stapled ends of the books, which ends thereupon resume their original or horizontal position. The needle points on the bar 242 prevent accidental displacement of the books during the fore and aft tucking motions of the bar 257.

The tucking operation just described is instanter. Immediately thereupon the books are ejected from the carrier. The form of ejecting means herein shown comprises a slide plate 261 which is mounted in a guide frame 262 on the table so as to be movable toward and from the carrier 44. The plate is provided with rearward tongues or extensions 261' which are so spaced apart and proportioned as to enter the links of the carrier containing the books which have been acted upon by the tucking mechanism. The plate is connected by a link 263 with one arm 264 of a crank-lever loose on the shaft 251, the other arm 265 of which lever bears a roll 266 that is maintained in operative contact with a cam 267 on the shaft 38 by the action of a spring 268 which connects the arm 264 to a depending pin beneath the table.

The cam 267 comprises a disk having its circumference interrupted by a depression 269, which is so related to the tappet block 255 on the disk 256 that the roll 266 on the arm 265 of the crank-lever rides upon the plane circumference of the cam until the tappet has engaged and escaped the roll 254 of the rock-arm 253, whereupon the depression 269 passes under and beyond the roll 266. The latter roll is forced into the depression by the retracting action of the spring 268 on the crank lever, and hence the lever moves the slide 261 rearward in a manner to engage the series of books and eject them from the carrier. Thereupon the roll 266 is raised upon the higher portion of the cam disk and the slide is, perforce, retracted against the action of the spring, being thus maintained until the depressed portion of the cam disk, in its continued rotation, again engages the roll 266, and so on.

In case the cover blanks shall have been treated exteriorly with ignition material for the matches preparatory to the stacking of the blanks in the hoppers for delivery to the carrier, the match-books (D) when they are ejected from the carrier as just described will be complete and ready for packing; but if, on the other hand, the cover blanks, when stacked, have not been supplied with ignition material, then such material is preferably applied to the stapled folds of the covers after the books have been ejected from the carrier. In the latter case a supplemental carrier is provided, the same comprising an endless chain of links 270 corresponding with the links of the carrier 44, each link being, however, provided with a spring clip 271 which overhangs the space between the walls of the link 270. A portion of the carrier 270 is mounted to travel at the rear of and parallel to the left hand end of the carrier 44, as seen in Figs. 1 and 4, a suitably-disposed sprocket-wheel 272 being provided whereby the carrier 270 after traveling concurrently with the carrier 44, and with its links in registry with those of the latter, is directed downward and then outward to the left. The shaft of this wheel 272 bears a bevel-wheel 273 which meshes with and is driven by a similar wheel 274 on the shaft 62 previously referred to. (See Figs. 4, 5 and 6).

At each interval of rest of the two carriers a series of match-books are transferred by the slide plate 261 from the links of the carrier 44 to those of the carrier 270; the spring clips of which latter overhang and grasp the books. As the two carriers progress the carrier 270 conveys the books partially around the wheel 272 and then to the left; the stapled folds of the books thus being on the underside of the books. A suitable supporting frame, including a table 275, for the supplemental carrier and its accessories is provided.

In the path of the stapled folds, during their progress with the lower run of the carrier 270 is a brush wheel 276 (Fig. 1ª) which is mounted to rotate within and above a receptacle 277 containing ignition "paint", whereby such paint is applied to the succeeding folds during their travel. In the present instance the shaft 278 of the brush wheel is provided with a spur wheel 279 in mesh with a pinion 280 carried by a shaft 281 having its bearings in a bracket on a pedestal 282 which supports the paint receptacle. On this shaft 281 is a sprocket-wheel 283 which is connected by means of a chain 284 with a similar wheel 285 on the shaft of a sprocket-wheel 286 operatively driven from the shaft 62 by coacting bevel-wheels 287, 288 respectively. Thus appropriate rotary motion is transmitted to the brush wheel. The carrier 270 with the painted books thereon passes about the wheel 286 and through an extended drying path, returning thence to its position alongside of and in parallelism with the carrier 44. Here the books, before they reach the tucking station, are ejected from the carrier 270 by means of a transverse slide 289 generally similar in construction to the ejecting slide 261. The slide 289, which is guided in a frame 290 on the table 275, is connected with an up-standing arm 291 fast on a rock shaft 292 having its bearings in hangers 293 depending from the table. Fast on this shaft is an arm 294 bearing a roll 295 that is maintained in operative contact with a cam 296 on the shaft 38 by the action of a spring 297 which connects the arm 291 to a pin depending from the table 275. The contour of the cam is such that in each dwell of the supplemental carrier 270 the slide 289 is reciprocated to eject a series of completed match books from said carrier to and upon an incline 298 leading from the table. (See Fig. 16).

A sprocket wheel 299 is mounted and arranged to support and guide the carrier 270 as it approaches the ejecting slide 289, the shaft of which wheel bears a bevel gear 300 in mesh with a similar gear 301 on the shaft 62.

In the organized machine above described the match-strip feeding mechanism is located at the right hand end of the main supporting frame, and the upper run of the carrier 44 travels, perforce, from left to right. By the provision of a similar machine, but with the strip feeding mechanism at the left hand side and the upper run of the carrier traveling from right to left, (as indicated by the dotted lines at the right of Fig. 1), two machines, or units, can be installed in endwise relation to each other, and thus the services of a single attendant can be availed of to feed the two machines simultaneously with match strips. This is an important factor, the economical advantage of which is manifest. The main shafts of the two machines, which are in longitudinal alinement with each other, are independently driven, and hence in the event of the stoppage of one of the machines for any cause the operation of the other can be continued.

It is to be noted that the ignition material may be applied to the stapled covers while they are borne by the carrier 44, in which case the "paint" is applied to the progressing covers in the lower run of said carrier; the guide-bar 233 being suitably cut-away to expose the stapled covers to the action of a paint-applying device, such, for example, as the rotary brush 276 illustrated in Fig. 1ª. With such a construction the supplemental carrier 270 and its accessories are unnecessary.

In Figs. 31 and 32 I have shown a modified construction of the character previously mentioned whereby the cover blanks are severed from rolls of material preparatory to the introduction of the blanks in the carrier. In this construction the leading ends of webs of material A', running in spaced relation to each other from suitably-disposed rolls, (not shown) are intermittently fed across the mouths of the folding passages 82 and the paths of the respective folding blades 83, by means of a pair of feed rolls 302; such leading ends during each dwell thereof are transversely severed a suitable distance in advance of the folding passages to provide appropriate cover blanks a, which are then engaged by the blades 83 and delivered in folded condition to the carrier 44 similarly to the blanks supplied by the hoppers, as previously stated.

In the present illustration, the shafts of the feed rolls 302 are journaled in bearings 303 supported by a table extension 304 on the bracket structure 67. These shafts are provided with intermeshing gears 305, with one of which meshes a larger gear 306 mounted on a suitably supported shaft 307.

On the shaft 307 is a ratchet wheel 308 with the teeth of which co-acts a pawl 309 carried by one arm of a lever 310 which is fulcrumed on the shaft 307. The other arm of the lever is connected by means of a link 311 to one end of a rock-lever 312 hung on a stud 313 supported by the main frame. The rock-lever is provided with a roll 314 that is held in active contact with a cam 315 on the shaft 38 by means of a spring connection 316, the contour of said cam being such that the rock-lever is periodically oscillated to effect the proper feeding action of the pawl 309 on the ratchet wheel.

Overlying the webs A' of cover material, rearward of the feed rolls 302, is a transverse knife 317 which is carried by a cross-head 318 slidable in vertical guides in standards 319. The ends of the cross-head are pivotally connected to the arms 320 of a yoke frame which is guided in openings in the table 33, said frame having a depending arm 321 jointed to a rock-lever 322 hung on a stud 323 supported by the main frame. This rock-lever bears a roll 324 which is held in operative contact with a cam 325 on the shaft 38 by means of a suitable spring 326. The contour of the cam is such that immediately upon the feeding of the webs to the path of the folding blades the knife is lowered to sever the webs transversely and is then raised and so maintained until the next succeeding lengths of the webs have been advanced by the feed-rolls, and so on.

327 designates suitably-disposed guide devices for the respective webs of cover material in their passage from the feed-rolls to the folding blades.

I claim—

1. In a machine for making match books, the combination with a carrier having spaced-apart cover-receiving members, of means for simultaneously supplying covers to a series of alternate receiving members, means for intermittently moving said carrier to position succeeding series of such members for the reception of covers, whereby each succeeding receiving member when it progresses beyond the cover-supplying means contains a cover, means for supporting a match strip laterally and longitudinally of the path of travel of the covers borne by said members, means for simultaneously subdividing said strip throughout its length into a row of match cards, and means for feeding the said cards in alternate series to the carrier and upon succeeding series of covers in the carrier.

2. In a machine for making match books, the combination with a carrier having spaced-apart cover-receiving members of means for simultaneously supplying covers to a series of alternate receiving members, means for intermittently moving said carrier to position succeeding series of such members for the reception of covers, whereby each succeeding receiving member when it progresses beyond the cover-supplying means contains a cover, means for supporting a match strip laterally and longitudinally of the path of travel of the covers borne by said members, means for simultaneously subdividing said strip throughout its length into a row of match cards, means for feeding the said cards in alternate series to the carrier and upon succeeding series of covers in the carrier, and means for simultaneously fastening together the associated cards and covers of each series as rapidly as said cards are placed in the covers.

3. In a machine for making match books, the combination with a carrier having spaced-apart cover-receiving members, of means for supplying to a series of alternate members covers having forwardly projecting flaps, means for intermittently moving said carrier to position succeeding series of such members for the reception of covers, whereby each succeeding receiving member when it progresses beyond the cover-supplying means contains a cover, means for flexing the flaps of the succeeding covers and maintaining them in that condition for an extended interval of time, means for supporting a match strip longitudinally of the carrier and adjacent the flexed flaps, means for simultaneously subdividing said strip throughout its length into a row of match cards, and means for feeding the said cards in alternate series to the carrier and upon succeeding series of covers in the carrier.

4. In a machine for making match books, the combination with a carrier having spaced-apart cover-receiving members, of means for supplying to a series of alternate members covers having forwardly projecting flaps, means for intermittently moving said carrier to position succeeding series of such members for the reception of covers, whereby each succeeding receiving member when it progresses beyond the cover-supplying means contains a cover, means for flexing the flaps of the succeeding covers and maintaining them in that condition for an extended interval of time, means for supporting a match strip longitudinally of the carrier and adjacent the flexed flaps, means for simultaneously subdividing said strip throughout its length into a row of match cards, means for feeding the said cards in alternate series to the carrier and upon succeeding series of covers in the carrier, and means for simultaneously fastening together the associated cards and covers of each series as rapidly as said cards are placed in the covers.

5. In a machine for making match books, the combination with a carrier for covers having outwardly projecting flaps, means for flexing the said flaps in angular relation to the bodies of the covers and maintaining them temporarily in that condition during the travel of the carrier, means for supporting match cards laterally of the carrier and adjacent the path of the flexed flaps, and means for feeding said cards to the carrier and upon their respective covers.

6. In a machine for making match books, the combination with a carrier for covers having outwardly projecting flaps, an element located adjacent to and laterally of the path of the carrier and having an inclined cam portion and a longitudinally extended portion, the cam portion being positioned in the path of the projecting flaps so as to bend them in angular relation to the bodies of the covers, and the extended portion being positioned to maintain the flags temporarily in bent condition, means for supporting match cards adjacent the path of the bent flaps, and means for feeding said cards to the carrier and upon their respective covers.

7. In a machine for making match books, the combination with a carrier for covers having outwardly projecting flaps, means for flexing the said flaps in angular relation to the bodies of the covers and maintaining them temporarily in that condition, means for supporting a match strip laterally and longitudinally of the carrier and adjacent the path of the flexed flaps, means for subdividing said strip into a row of match cards, and means for feeding the said cards in alternate series to the carrier and upon succeeding series of covers in the carrier.

8. In a machine for making match books, the combination with a carrier for covers having outwardly projecting flaps, means for flexing the said flaps in angular relation to the bodies of the covers and maintaining them temporarily in that condition, means for supporting a match strip laterally and longitudinally of the carrier and adjacent the path of the flexed flaps, means for subdividing said strip into a row of match cards, means for feeding the said cards in alternate series to the carrier and upon succeeding series of covers in the carrier, and means for simultaneously fastening together the associated cards and covers of each series as rapidly as said cards are placed in the covers.

9. In a machine for making match books, the combination with a carrier for covers having outwardly projecting flaps, means for flexing the said flaps in angular relation to the bodies of the covers and maintaining them temporarily in that condition during the travel of the carrier, a cover-holding member extending longitudinally of the carrier and in close relation to the flexures of the covers, means for supporting match cards laterally of the carrier and adjacent the path of the flexed flaps, and means for feeding said cards to the carrier and upon their respective covers.

10. In a machine for making match books, the combination with a cover carrier, of means for supporting a match strip laterally and longitudinally of the path of travel of said carrier, means for simultaneously subdividing said strip throughout its length into a row of match cards, and means for feeding the said cards in alternate series to the carrier and upon succeeding series of covers in the carrier.

11. In a machine for making match books, the combination with a cover carrier, of a match-strip supporting element adjacent to and longitudinally of the path of travel of the said carrier, means for longitudinally reciprocating said element with an interval of rest at the end of each stroke thereof, means for subdividing said strip into a row of match cards during an interval of rest of said element, and means for feeding the said cards to the carrier in alternate series during the respective intervals of rest of the said element.

12. In a machine for making match books, the combination with a cover carrier, of a match-strip supporting element adjacent to and longitudinally of the path of travel of the said carrier, means for longitudinally reciprocating said element with an interval of rest at the end of each stroke thereof, means for feeding a match strip upon said element while it is in one position of rest, means for subdividing the said strip into a row of match cards while in such position of rest, and means for feeding the said cards to the carrier in alternate series during the respective intervals of rest of the said element.

13. In a machine for making match books, the combination with a cover carrier, of a match-strip supporting carriage laterally and longitudinally of the path of travel of the said carrier, means for longitudinally reciprocating said carriage with an interval of rest at the end of each stroke thereof, a reciprocating cutter element overhanging said carriage and including a series of spaced-apart cutters for subdividing said strip into a row of match cards during an interval of rest of said element, and means for feeding the cards to the carrier in alternate series during the respective intervals of rest of the said element.

14. In a machine for making match books, the combination with a cover carrier, of a match-strip supporting carriage laterally and longitudinally of the path of travel of the said carrier, means for longitudinally reciprocating said carriage with an interval of rest at the end of each stroke thereof, a reciprocating cutter element overhanging said carriage and including a series of spaced-apart cutters for subdividing said strip into a row of match cards during an interval of rest of said element, spaced-apart backer members for the rear of alternate cards imposed on the carriage, and means for feeding the cards in alternate series to the carrier and upon the covers during the respective intervals of rest of the said element.

15. In a machine for making match books, the combination with a cover carrier, of means for supporting a match strip laterally and longitudinally of the path of travel of said carrier, means for simultaneously subdividing said strip throughout its length into a row of match cards, means for feeding the said cards in alternate series to the carrier and upon succeeding series of covers in the carrier, and means for simultaneously fastening together the associated cards and covers of each series as rapidly as said cards are placed in the covers.

16. In a machine for making match books, the combination with a cover carrier, of a match-strip supporting element adjacent to and longitudinally of the path of travel of the said carrier, means for longitudinally reciprocating said element with an interval of rest at the end of each stroke thereof, means for subdividing said strip into a row of match cards during an interval of rest of said element, means for feeding the said cards in alternate series to the carrier and upon the covers during the respective intervals of rest of the said element, and means for simultaneously fastening together the associated cards and covers of each series as rapidly as said cards are placed in the covers.

17. In a machine for making match books, the combination with a cover carrier, of a match-strip supporting element adjacent to and longitudinally of the path of travel of the said carrier, means for longitudinally reciprocating said element with an interval of rest at the end of each stroke thereof, means for feeding a match strip upon said element while it is in one position of rest, means for subdividing the said strip into a row of match cards while in such postion of rest, means for feeding the said cards in alternate series to the carrier and upon the covers during the respective intervals of rest of the said element, and means for simultaneously fastening together the associated cards and covers of each series as rapidly as said cards are placed in the covers.

18. In a machine for making match books, the combination with a cover carrier, of a match-strip supporting carriage laterally and longitudinally of the path of travel of the said carrier, means for longitudinally reciprocating said carriage with an interval of rest at the end of each stroke thereof, a reciprocating cutter element overhanging said carriage and including a series of spaced-apart cutters for subdividing said strip into a row of match cards during an interval of rest of said element, means for feeding the cards in alternate series to the carrier and upon the covers during the respective intervals of rest of the said element, and means for simultaneously fastening together the associated cards and covers of each series as rapidly as said cards are placed in the covers.

19. In a machine for making match books, the combination with a cover carrier, of a match-strip supporting carriage laterally and longitudinally of the path of travel of the said carrier, means for longitudinally reciprocating said carriage with an interval of rest at the end of each stroke thereof, a reciprocating cutter element overhanging said carriage and including a series of spaced-apart cutters for subdividing said strip into a row of match cards during an interval of rest of said element, spaced-apart backer members projecting above said carriage at the rear of alternate cards thereon, means for feeding the cards in alternate series to the carrier and upon the covers during the respective intervals of rest of the said element, and means for simultaneously fastening together the associated cards and covers of each series as rapidly as said cards are placed in the covers.

20. In a machine for making match books, the combination with a cover carrier, of a match-strip supporting element adjacent to and longitudinally of the path of travel of the said carrier, means for longitudinally reciprocating said element with an interval of rest at the end of each stroke thereof, means for subdividing said strip into a row of match cards during an interval of rest of said element, a pressure member mounted to move with the said carriage, said member overhanging the cards supported on the carriage, means for moving said member upon and from the underlying cards at predetermined intervals, and means for feeding the said cards in alternate series to the carrier and upon their respective covers during the intervals of rest of the said element.

21. In a machine for making match books, the combination with a cover carrier, of a match-strip supporting element adjacent to and longitudinally of the path of travel of the said carrier, means for longitudinally reciprocating said element with an interval of rest at the end of each stroke thereof, a vertically-reciprocative plunger overhanging the strip, cutting members on said plunger for subdividing the strip into a row of match cards, spring-pressed stripper members mounted on said plunger to act upon alternate cards on said element during the reciprocation of the plunger, and means for feeding the row of cards in alternate series to the carrier and upon their respective covers during the respective intervals of rest of the said element.

22. In a machine for making match books, the combination with a cover carrier, of a match-strip supporting element adjacent to and longitudinally of the path of travel of the said carrier, means for longitudinally reciprocating said element with an interval of rest at the end of each stroke thereof, a vertically-reciprocative plunger overhanging the strip, cutting members on said plunger for subdividing the strip into a row of match cards, spring-pressed stripper members mounted on said plunger to act upon alternate cards on said element during the reciprocation of the plunger, means for feeding the row of cards in alternate series to the carrier and upon their respective covers during the respective intervals of rest of the said element, and means for simultaneously fastening together the cards and covers of each series as rapidly as said cards are placed in the covers.

23. In a machine for making match books, the combination with a cover carrier, of a reciprocative slide for feeding match strips toward and laterally of the path of travel of the carrier, means for subdividing each positioned strip into match cards, and mechanism for feeding said cards to the carrier and upon their respective covers, said mechanism comprising pusher members, means for reciprocating said members toward and from the carrier, and for raising and supporting said members above the path of the strip-feeding slide when the members are retracted from the carrier.

24. In a machine for making match books, the combination with a cover carrier, of a match-strip supporting element adjacent to and longitudinally of the path of travel of the carrier, means for longitudinally reciprocating said carrier with an interval of rest at the end of each stroke thereof, a slide for feeding a match strip upon said element during an interval of rest of the latter, means for subdividing the positioned strip into match cards in such interval of rest, and mechanism for feeding the said cards in alternate series to the carrier during the intervals of rest of the said element, said mechanism comprising a series of spaced-apart pusher members, and means for reciprocating said members toward and from the carrier and for raising and supporting said members above the path of the strip-feeding slide when the members are retracted from the carrier.

25. In a machine for making match books, the combination with a cover carrier, of a match-strip supporting element adjacent to and longitudinally of the path of travel of the carrier, means for longitudinally reciprocating said carrier with an interval of rest at the end of each stroke thereof, a slide for feeding a match strip upon said element during an interval of rest of the latter, means for subdividing the positioned strip into match cards in such interval of rest, and mechanism for feeding the said cards in alternate series to the carrier and upon the covers during the intervals of rest of the said element, said mechanism comprising a series of spaced-apart pusher members, means for reciprocating said members toward and from the carrier and for raising and supporting said members above the path of the strip-feeding slide when the members are retracted from the carrier, and means for simultaneously fastening together the associated cards and covers of each series as rapidly as said cards are placed in the covers.

26. In a machine for making match books, the combination with a cover carrier, of means for supplying match cards to the carrier and upon their respective covers when the carrier is at one location, and binding means arranged in co-operative relation to the card supplying means and the carrier so as to fasten together the cards and their respective covers at the said location of the carrier immediately upon the association of said cards and covers.

27. In a machine for making match books, the combination with a cover carrier, of means for introducing folded cover blanks therein, means for thereafter when the carrier is at one location supplying match cards to the carrier and entering their marginal portions in the folds of their respective covers, and binding means arranged in co-operative relation to the card supplying means and the carrier so as to fasten together the margins of the cards and their respective cover folds at the said location of the carrier immediately upon the association of said cards and covers.

28. In a machine for making match books, the combination of means for advancing covers in succeeding series to one location, means for delivering a series of match cards to each succeeding series of covers at said location, and staple forming, driving and clinching mechanism for simultaneously fastening together the associated cards and covers of each series at said location immediately upon the association of said cards and covers.

29. In a machine for making match books, the combination of means for advancing covers in succeeding series, means for supporting a match strip laterally and longitudinally of the path of travel of said covers, means for simultaneously subdividing said strip throughout its length into a row of match cards, means for delivering the said cards in alternate series to the covers, and staple forming, driving and clinching mechanism for simultaneously fastening together the associated cards and covers of each series as rapidly as said cards are delivered to the covers.

30. In a machine for making match books, the combination of means for advancing covers in succeeding series, a match-strip supporting element adjacent to and longitudinally of the path of the covers, means for longitudinally reciprocating said element with an interval of rest at the end of each stroke thereof, means for subdividing said strip into a row of match cards during an interval of rest of said element, means for delivering the cards in alternate series to the adjacent succeeding series of covers during the respective intervals of rest of the said element, and staple forming, driving and clinching mechanism for simultaneously fastening together the associated cards and covers of each series as rapidly as said cards are delivered to the covers.

31. In a machine for making match books, the combination of an endless carrier for covers having outwardly projecting flaps, means for supplying match cards to said carrier and upon their respective covers at one location, means for fastening the cards to their respective covers at said location immediately upon the association of said cards and covers, means for folding the projecting flaps upon the adjacent cards as the united covers and cards progress with the carrier to another location, and means at said latter location for tucking the folded flaps under the fastened folds of the covers.

32. In a machine for making match books, the combination of an endless carrier for covers having outwardly projecting flaps, said carrier having upper and lower horizontal runs, means for feeding match cards to the upper run of the carrier and upon their respective covers, means for fastening the cards to their respective covers, means for flexing the projecting flaps as the united cards and covers progress with the carrier and then folding the flaps up against the match cards and maintaining them thus disposed until the covers and cards progress to the upper path of travel of the carrier, and means for tucking the folded flaps under the fastened folds of their respective covers.

33. In a machine for making match books, the combination of an endless carrier for covers having outwardly projecting flaps, said carrier having upper and lower horizontal runs, means for feeding match cards to the upper run of the carrier and upon their respective covers, means for fastening the cards to their respective covers, means for flexing the projecting flaps as the united cards and covers progress with the carrier and then folding the flaps up against the match cards and maintaining them thus disposed until the covers and cards progress to the upper path of travel of the carrier, means for tucking the folded flaps under the fastened folds of their respective covers, and means for thereupon ejecting the associated cards and covers from the carrier.

34. In a machine for making match books, each including a cover having a fastened end fold and a flexible flap, the combination of means for supporting a book in horizontal position, means for depressing the outer portion of the end fold and thereby raising the free edge of the fold, and means for tucking the free end of the cover flap beneath the raised edge of the end fold.

35. In a machine for making match books, each including a cover having a fastened end fold and a flexible flap, the combination of means for supporting a book in horizontal position, book-retaining means, including a fold-engaging member, and means for actuating said member to engage and disengage it with and from the end fold, respectively, and means for tucking the free end of the flap under the adjacent edge of the end fold when the said member is engaged therewith.

36. In a machine for making match books, each including a cover having a fastened end fold and a flexible flap, the combination of means for supporting a book in horizontal position, a gripping member movable upon and from the end fold, a second gripping member movable upon and from the cover flap, and means for concurrently actuating said members to impart a vertical reciprocation to the first-named member and a compound vertical and horizontal reciprocation to the second-named member.

37. In a machine for making match books, each including a cover having a fastened end fold and a flexible flap, the combination of means for supporting a book in horizontal position, book-retaining means, including a fold-engaging member, and means for actuating said member to engage and disengage it with and from the end fold, respectively, means for tucking the free end of the flap under the adjacent edge of the end fold when the said member is engaged therewith, and means for ejecting the book from the support immediately upon the disengagement of the said member from the end fold.

38. In a machine for making match books, each including a cover having a fastened end fold and a flexible flap, the combination of means for supporting a book in horizontal position, a vertically reciprocative point-bearing bar movable upon and from the end fold, spring means tending to maintain said bar normally depressed, a second vertically-reciprocative point-bearing bar movable upon and from the cover flap, a pair of longitudinally and vertically movable arms carrying the latter bar and slidably engaged with the first-named bar, means for longitudinally reciprocating said arms at intervals, and stationary cams co-acting with said arms to impart downward and upward motion thereto during their longitudinal reciprocation.

Signed at New York, in the county and State of New York, this 27th day of July, A. D. 1920.

JOHN R. NOLAN.